(12) United States Patent
Roedel et al.

(10) Patent No.: US 11,444,797 B2
(45) Date of Patent: Sep. 13, 2022

(54) DISPLAYING NOTIFICATIONS FOR STARTING A SESSION AT A TIME THAT IS DIFFERENT THAN A SCHEDULED START TIME

(71) Applicant: MICROSOFT TECHNOLOGY LICENSING, LLC, Redmond, WA (US)

(72) Inventors: Dominic Roedel, Prague (CZ); Ewin Davis Kannuthottiyil, Prague (CZ); Philipp Steinacher, Prague (CZ); Eric R. Sexauer, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/125,951

(22) Filed: Dec. 17, 2020

(65) Prior Publication Data

US 2021/0105149 A1    Apr. 8, 2021

Related U.S. Application Data

(63) Continuation of application No. 16/455,562, filed on Jun. 27, 2019, now Pat. No. 10,972,301.

(51) Int. Cl.
*G06F 15/16* (2006.01)
*H04L 12/18* (2006.01)

(52) U.S. Cl.
CPC ...... *H04L 12/1895* (2013.01); *H04L 12/1818* (2013.01); *H04L 12/1822* (2013.01); *H04L 12/1859* (2013.01); *H04L 12/1881* (2013.01)

(58) Field of Classification Search
CPC ............ H04L 12/1818; H04L 12/1822; H04L 12/1859; H04L 12/1881; H04L 12/1895
See application file for complete search history.

(56) References Cited

U.S. PATENT DOCUMENTS

2008/0114840 A1* 5/2008 Rollin ............ G06Q 10/06311
709/206
2014/0362979 A1* 12/2014 Kaplan ............... H04M 3/568
379/67.1

(Continued)

OTHER PUBLICATIONS

"Final Office Action Issued in U.S. Appl. No. 16/412,241", dated Jan. 26, 2021, 20 Pages. (MS# 406167-US-NP).

*Primary Examiner* — Normin Abedin
(74) *Attorney, Agent, or Firm* — Newport IP, LLC; Jacob P. Rohwer

(57) ABSTRACT

A system provides a notification associated with joining a communication session based on trigger events other than a scheduled start time for the communication session. The notification informs the recipient user of current contextual information associated with the communication session and to provide the user with an effective and efficient way to join the communication session (a.k.a., the meeting). The contextual information may indicate that some other user has initiated the communication session (e.g., is the first to join the communication session), that a predefined user has joined the communication session (e.g., a user's manager has joined), and/or that a topic of interest has been brought up during the communication session (e.g., one or more users start speaking about the topic). As described herein, the notification(s) can be provided based on occurrences of different types of events that occur at times that are different than a scheduled start time.

20 Claims, 24 Drawing Sheets

(56) References Cited

U.S. PATENT DOCUMENTS

| | | | |
|---|---|---|---|
| 2015/0074189 A1* | 3/2015 | Cox | G10L 25/48 |
| | | | 709/204 |
| 2016/0364665 A1* | 12/2016 | Hurst | H04L 12/1818 |

\* cited by examiner

DISPLAYING NOTIFICATIONS FOR STARTING A SESSION AT A TIME THAT IS DIFFERENT THAN A SCHEDULED START TIME

CROSS-REFERENCE TO RELATED APPLICATION

This application is a continuation of, and claims priority to, U.S. patent application Ser. No. 16/455,562, filed Jun. 27, 2019 and entitled "Displaying Notifications for Starting A Session At A Time That Is Different Than A Scheduled Start Time," the entire contents of which are incorporated herein by reference.

BACKGROUND

There are a number of different systems and applications that allow users to collaborate. For example, some systems allow people to collaborate and/or conduct a communication session (e.g., a virtual meeting such as a video conference) by the use of live video streams, live audio streams, and other forms of real-time, text-based or image-based mediums. Some systems also allow users to share files during a communication session. Further, some systems provide users with tools for editing content of shared files during a communication session.

Typically, a scheduled start time is the main driver for determining when to remind a user to join a meeting. Conventionally, users invited to attend the meeting are provided with a generic notification reminding the users that the meeting is set to begin at the scheduled start time. This generic notification is typically sent at a predefined time (e.g., when the meeting is scheduled to start, five minutes before the meeting is scheduled to start, etc.). In some situations, a user who is planning to meet with other users at a scheduled time may actually be able to meet earlier than the scheduled start time for various reasons. In one example, an obligation of the user may be canceled just prior to the scheduled start time thereby freeing up some calendar space and enabling the user to join the meeting earlier than expected. In another example, the user may have a tendency to join meetings early.

Unfortunately, users other than the one who joined the meeting early remain unaware that someone has joined the meeting early and that conducting the meeting earlier than scheduled may be possible. Moreover, the user that joins the meeting early often refrains from contacting the other users in order to request that the other users meet earlier, as this may inadvertently seem rude or pushy. These commonly occurring circumstances result in inefficient time and resource usage since common user behavior rigidly adheres to using the originally scheduled starting times to initiate meetings despite circumstantial changes making earlier (or later) meeting times more convenient.

It is with respect to these considerations and others that the disclosure made herein is presented.

SUMMARY

The techniques disclosed herein describe a system that provides a notification associated with joining a communication session based on trigger events other than a scheduled start time for the communication session. The notification is configured to inform the user of current contextual information associated with the communication session and to provide the user with an effective and efficient way to join the communication session (a.k.a., the meeting). The contextual information may indicate that some other user has initiated the communication session (e.g., is the first to join the communication session), that a predefined user has joined the communication session (e.g., a user's manager has joined), and/or that a topic of interest has been brought up during the communication session (e.g., one or more users start speaking about the topic). As described herein, the notification(s) can be provided based on occurrences of different types of events that occur at times that are different than a scheduled start time.

In an exemplary implementation, the system can access calendar data that defines an invitee list for a communication session. For example, an organizing user may utilize an email client or other collaboration application to generate a meeting invitation that indicates various characteristics for the meeting. Exemplary characteristics may include, but are not limited to, the scheduled start time for the communication session, a scheduled duration for the communication session, and users that make up the invitee list for the communication session. This invitee list can include the organizing user (may be referred to herein as an "organizer"). The organizing user may send the meeting invitation to the users on the invitee list. In some examples, upon receipt of the meeting invitation, individual users on the invitee list can choose to accept the meeting invitation, tentatively accept the meeting invitation, or decline the meeting invitation.

A first type of join event that can cause a notification to be transmitted can occur when a user on the invitee list joins the communication session. This user may join the communication session at a time that is before or after the scheduled start time for the meeting. Responsive to the user joining the communication session, the system can provide a notification to another user (i.e., the recipient) on the invitee list that has yet to join the communication session. The notification can inform the recipient of the identity of the user whom has joined the communication session. Consequently, the recipient is made aware that at least one person has joined the communication session, and therefore, the other user can decide to join the communication session at his or her convenience.

As users' schedules are often busy and dynamically changing, the techniques described herein are capable of providing some added and valuable time to the users' schedules. For example, using the techniques described herein, an amount of time a user spends on his or her device waiting for another user to join a communication session can be reduced if other user(s) join the communication session before a scheduled start time. Moreover, using the techniques described herein, a user can continue to work on his or her own tasks after a scheduled start time for a communication session knowing that he or she will be notified when others join the communication session.

In additional or alternative embodiments, a notification can be provided based on occurrences of other types of join events. For instance, these other types of join events can occur when predefined users that are likely associated with some degree of importance join the communication session. For instance, these users may be expected to contribute to a meeting discussion, to provide valuable input with regard to a decision to be made during the communication session, to present content of a file during the communication session, etc. These other types of join events can cause a notification to be transmitted regardless of a position at which a user joins the meeting (e.g., the user may not be the first person to join the meeting). However, due to their likely importance to the communication session, invitees may still want to be informed when these users join the communication session.

For example, an important user may be the organizer of a communication session because the organizer of the communication session often starts the discussion, guides the discussion, presents content, etc. Accordingly, another type of join event that can cause a notification to be transmitted can occur when an organizer of the communication session initially joins—even if others have joined prior to the organizer joining.

In another example, an important user may be a required attendee to the communication session because being a required attendee signals that the user will be relied upon to contribute to the communication session in some manner. Therefore, another type of join event that can cause a notification to be transmitted can occur when a required attendee is the first required attendee to join the communication session.

In yet another example, an important user may be a user that is external to a domain (e.g., company, office, department, geographic location, etc.) to which the organizer of the communication session belongs. In a specific example, an organizer from the XYZ company may invite users from the XYZ company to the communication session, as well as users from a partner ABC company. Thus, the users from the partner ABC company can be considered external users that are invited to the communication session. An external user may be considered an important user because he or she is a guest to the communication session and/or because he or she may be expected to contribute to the communication session in some manner. Consequently, another type of join event that can cause a notification to be transmitted can occur when an external user is the first external user to join the communication session.

In a further example, another type of join event that can cause a notification to be transmitted can occur when at least one representative from each of a plurality of different stakeholder groups (e.g., company, office, department, geographic location, etc.) has joined the communication session. That is, a communication session may be scheduled to discuss an issue in which each of the different stakeholder groups has an interest. Thus, invitees to the communication session may want to know when at least one representative from each stakeholder group has joined the communication session, which can signal to the invitees that the communication session may be able to start at a time that is different than a scheduled start time.

As described herein, the system can monitor for join events that occur with respect to a communication session to which a user has been invited but has not yet joined. Upon detection of a join event, the system can generate and transmit a notification to a client device associated with the user to inform the user of the join event. To implement the monitoring, the system can access and/or determine a notification parameter associated with a user account. The notification parameter can specify a type of join event that provides a basis for transmitting the notification. Moreover, the notification parameter can define various conditions that must be satisfied in order for the system to transmit the notification. The notification parameters and/or the conditions can be defined by the user. In some implementations, the user can define a notification parameter for an individual meeting, for a series of scheduled meetings (e.g., a reoccurring team meeting that happens once a week), and/or for all meetings to which the user is invited. Alternatively, the notification parameters and/or the conditions can be set as default settings by the system or an administrator of a user account.

In some embodiments, a condition for transmitting a notification may be associated with a predetermined acceptance status for a user. For example, a condition may require that the user has accepted, or tentatively accepted, a meeting invitation in order for the system to transmit the notification upon detection of a join event defined by a notification parameter (e.g., when the first person joins the meeting). In such a scenario, if the meeting invitation is declined by the user, then the notification would not be transmitted to the user upon detection of the join event because the user likely has little or no interest in being made aware of the join event.

In some embodiments, a condition may indicate that a current time needs to be within a threshold time range from the scheduled start time for the meeting in order for the notification to be transmitted. For example, the condition may define a threshold time range of fifteen minutes before and/or after the scheduled start time. Accordingly, the condition may prevent the notification from being transmitted at the time the join event occurs if the time the join event occurs is more than fifteen minutes before the scheduled start time for the meeting. In these instances when the join event occurs before the scheduled start time and before the threshold time range, the system may wait until the current time is within the threshold time range before transmitting the notification. Similarly, the condition may prevent the notification from being transmitted at the time the join event occurs if the time the join event occurs is more than fifteen minutes after the scheduled start time for the meeting. In these instances when the join event occurs after the scheduled start time and after the threshold time range, the system may never transmit the notification as the user likely may have moved on to other tasks and/or meetings on his or her schedule.

As described above, the notification can identify a user that caused the join event to occur (i.e., a user that has joined the meeting). Additionally, the notification can provide other context associated with the meeting, the user that already joined, and/or the user to which the notification is directed. In some instances, this additional context provides a custom reminder to the user that receives the notification. For example, the context can describe the type of join event for which the user configured a notification parameter (e.g., "Joe is the first person to join the meeting", "Joe, the organizer, has joined the meeting", "Joe is the first required attendee to join the meeting", "Joe is the first external participant to join the meeting", "A representative from each of the Design department, the Production department, and the Distribution department has joined the meeting", etc.). In another example, the context can inform the user of his or her acceptance status with respect to the meeting (e.g., "accepted", "tentatively accepted", "declined", etc.). In yet another example, the context can inform the user of a number of invitees that have already joined the meeting and/or a number of invitees that have yet to join the meeting. This can help the user decide if he or she should immediately join the meeting. If all attendees have already joined, the user may be more likely to join immediately. However, if a large number of attendees have yet to join, the user may wait a little longer to join the meeting unless the user want to collaborate with someone who has already joined. Moreover, the context can inform the user of an amount of time remaining until the meeting is scheduled to start.

The notification can also include a user interface element that enables the user to immediately join the meeting. In this way, if a user that is planning to meet with another user at a scheduled time decides, prior to the scheduled time, that an earlier meeting time is more convenient, the user can simply join the meeting early and the other user will be notified that the meeting has been initiated by the user. If that earlier meeting time is suitable for the other user, then the other user can immediately join the meeting.

In some embodiments, the system can notify a user that is already participating in a communication session of a user that wants to join the communication due to a detected event. The notification may ask the user that is already participating for consent to invite the user that wants to join, and thus, this user may serve as some sort of gatekeeper with respect to who is allowed to join the communication session. The user that wants to join may have previously set a notification parameter for the detected event. Moreover, in some cases, the user that wants to join may have not been originally invited to the communication session. Consequently, via the use of the consent notification described herein, the privacy of the people already participating in the communication session can be protected.

The event for which a notification parameter is set can be any type of event that may be of interest to a user. In one example, the event that can cause a consent notification to be transmitted can include a user identification being spoken aloud or entered in a comment during the communication session. In another example, the event that can cause a consent notification to be transmitted can include content of a particular topic being discussed or presented during the communication session. In yet another example, the event that can cause a consent notification to be transmitted can include a detected change from a first sentiment to a second sentiment during the communication session. In further examples, the event that can cause a consent notification to be transmitted can include a particular user joining or leaving the communication session.

The techniques described above can lead to more efficient use of computing resources. For instance, the amount of computing and networking resources consumed while a user waits for other users to join a meeting can be greatly reduced because the techniques described herein enable the meeting to start in more efficient manner. Further, the techniques disclosed herein can lead to a more efficient use of computing resources by eliminating the need for a person to perform a number of manual steps to join a meeting.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

DRAWINGS

The Detailed Description is described with reference to the accompanying figures. In the figures, the left-most digit(s) of a reference number identifies the figure in which the reference number first appears. The same reference numbers in different figures indicates similar or identical items.

Figure 4:
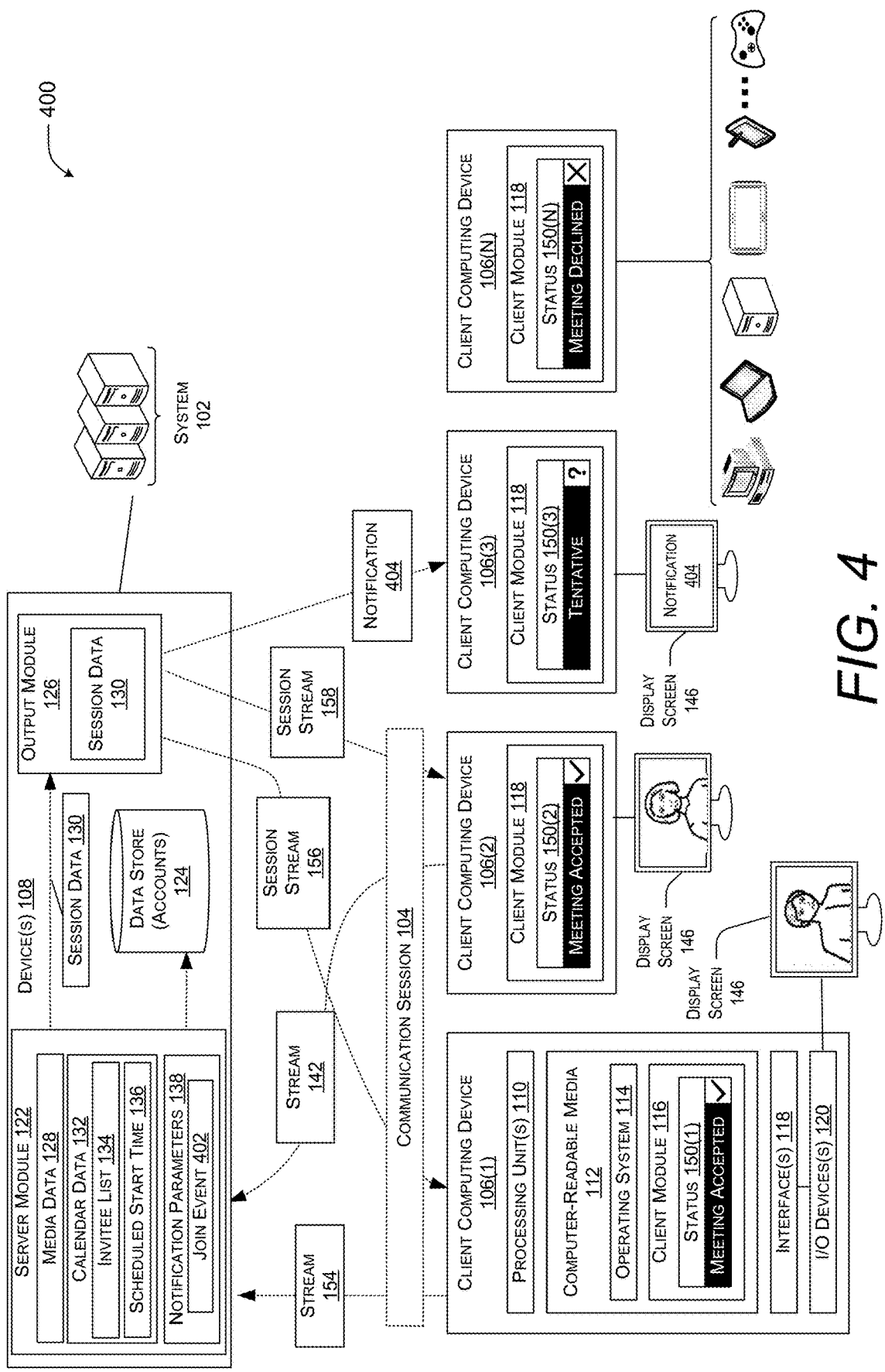

FIG. 4 is a diagram illustrating an example environment in which a system enables a user to join a communication session in response to receiving and viewing a notification informing the user of a join event that occurs when an organizer of the communication session joins, when a required attendee is the first required attendee to join, when an external user is the first external user to join, or when a representative from each of a plurality of different stakeholder groups has joined the communication session.

Figure 5:
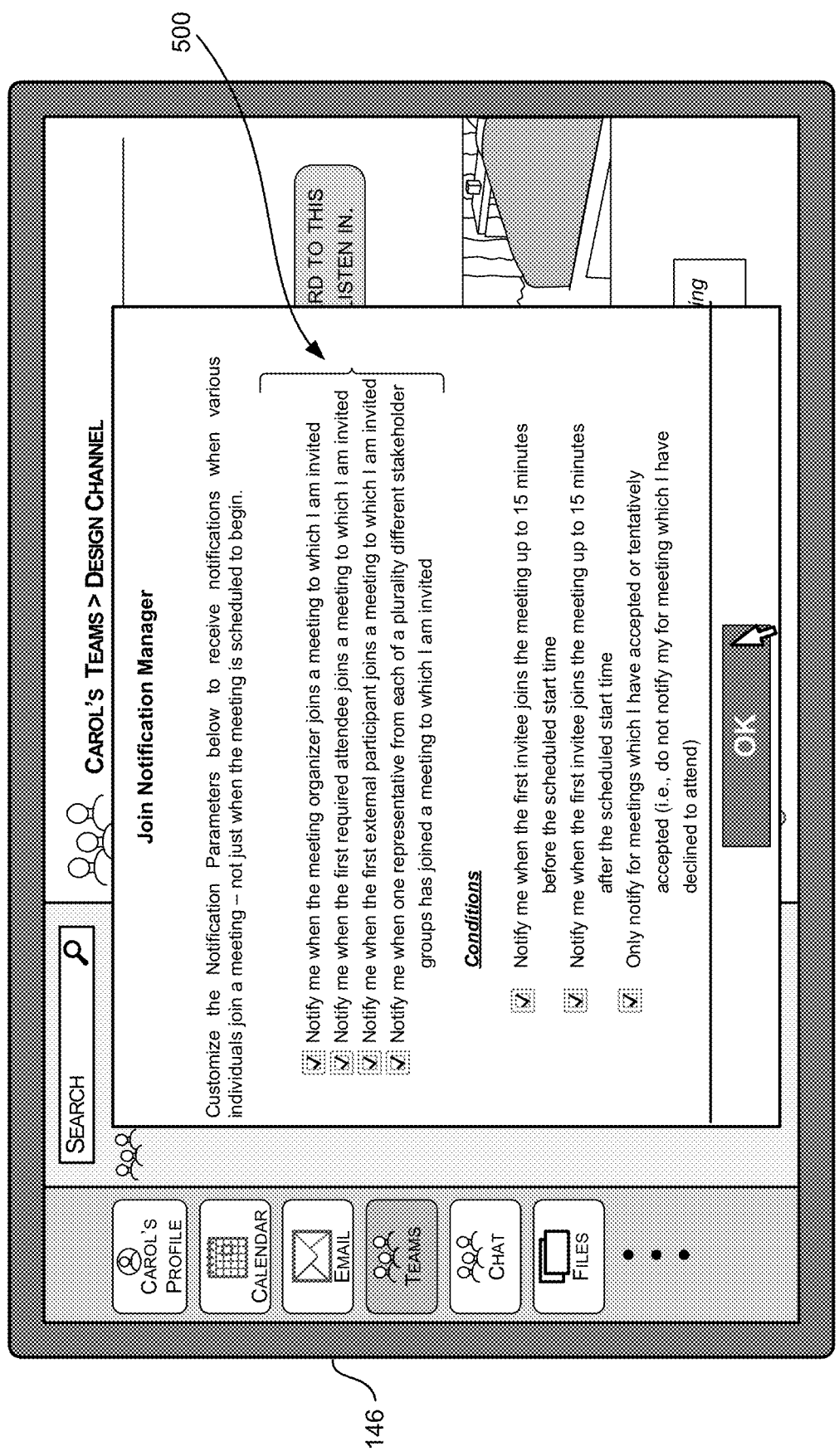

FIG. 5 illustrates an example notification manager user interface that displays selectable options configured to transmit notifications to a user when an organizer of a communication session joins the communication session, when a required attendee is the first required attendee to join the communication session, when an external user is the first external user to join the communication session, and/or when a representative from each of a plurality of different stakeholder groups has joined the communication session.

Figure 6A:
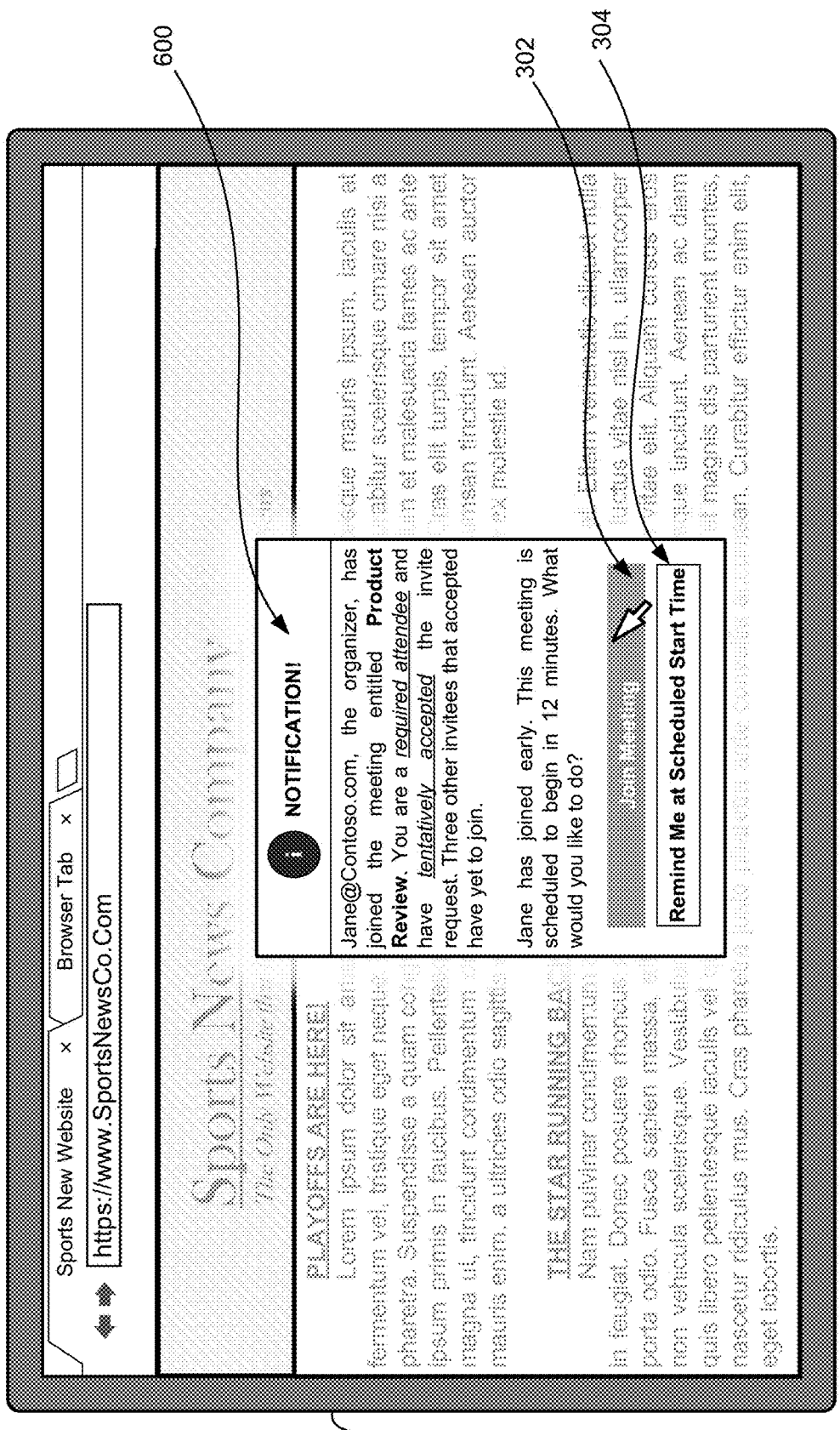

FIG. 6A illustrates an example notification user interface that displays a notification on a client device thereby informing a user that the organizer of a communication session has joined the communication session at a time that is different than a scheduled start time for the communication session.

Figure 6B:
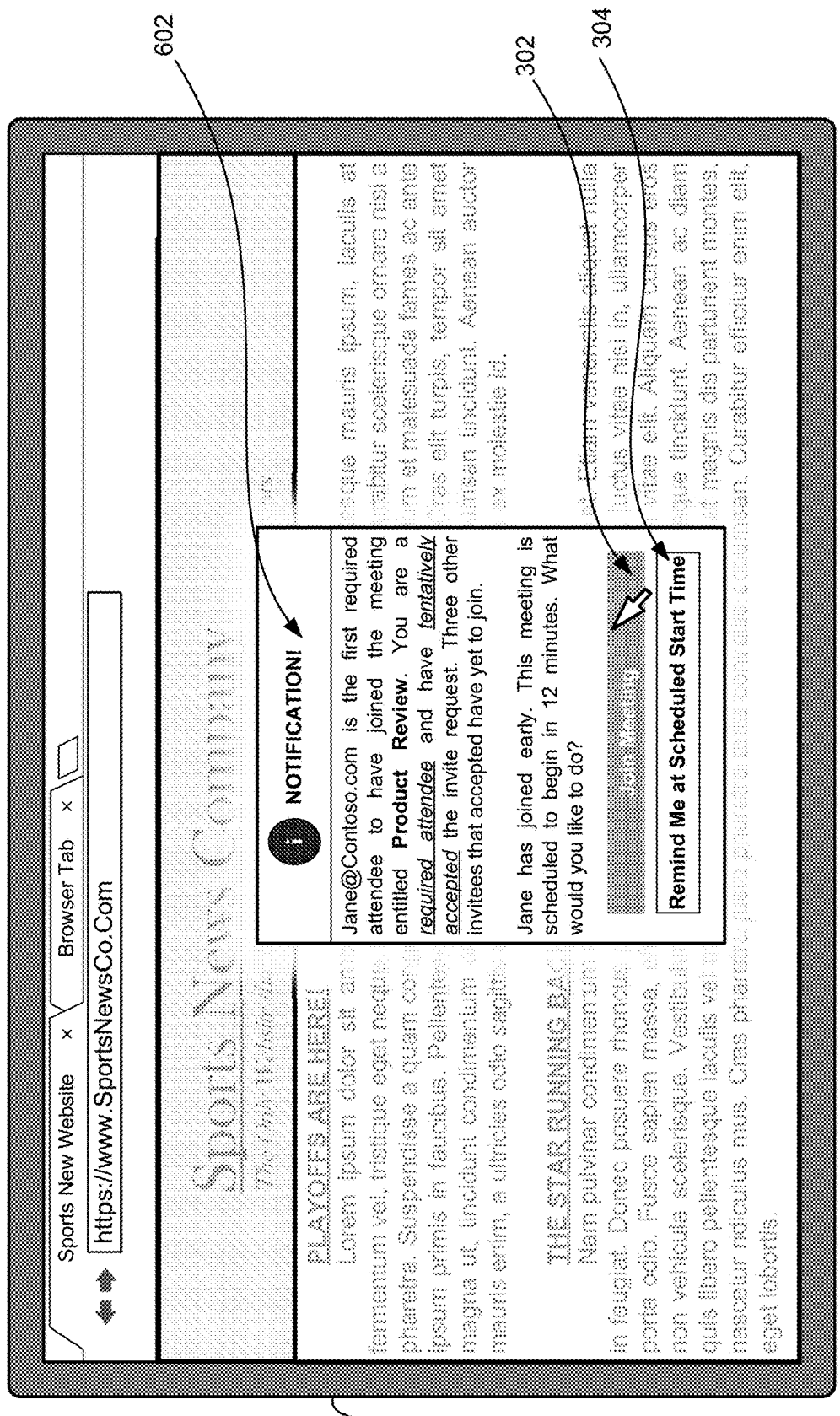

FIG. 6B illustrates an example notification user interface that displays a notification on a client device thereby informing a user that the first required attendee has joined a communication session at a time that is different than a scheduled start time for the communication session.

Figure 6C:
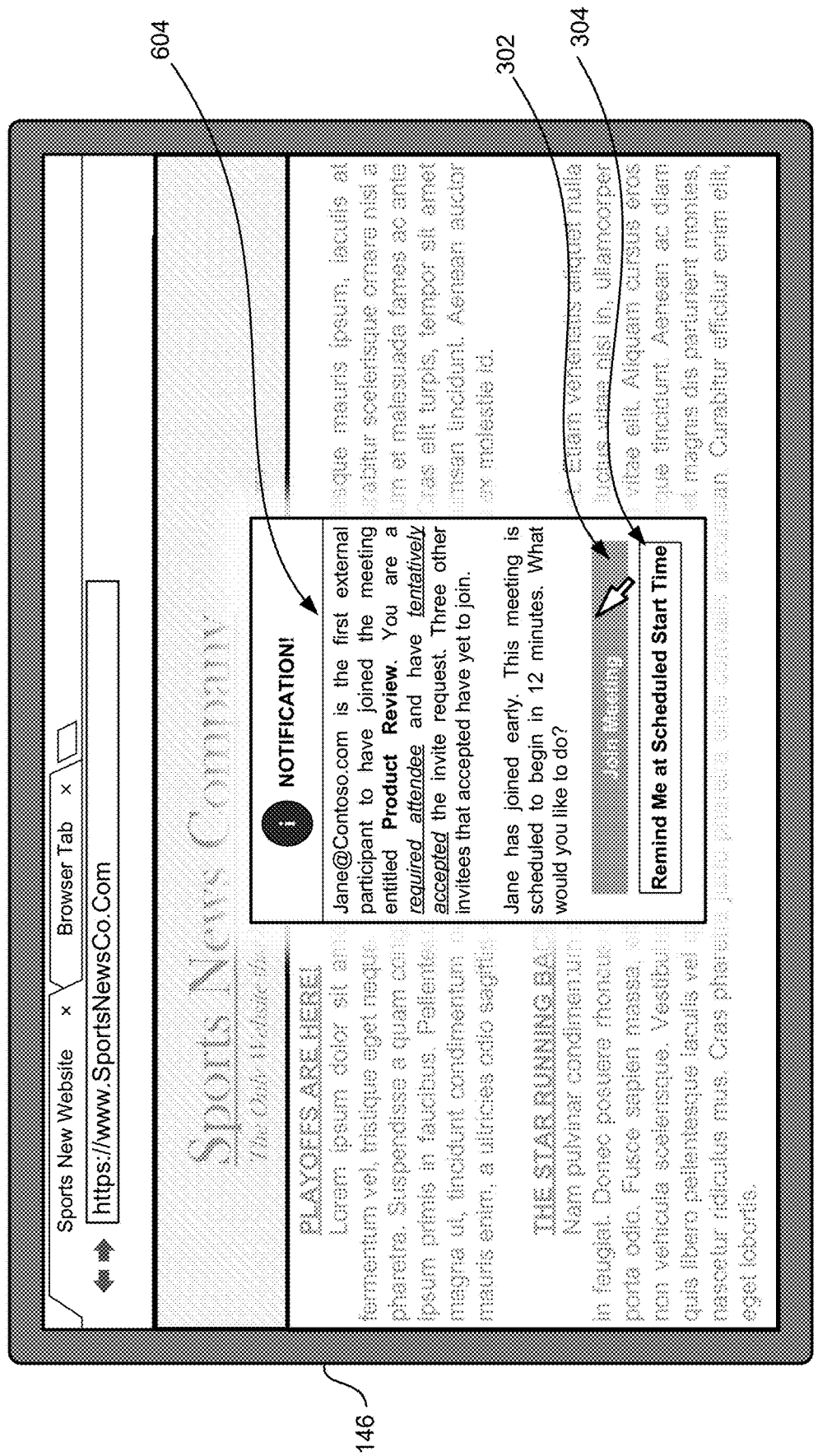

FIG. 6C illustrates an example notification user interface that displays a notification on a client device thereby informing a user that the first external user has joined a communication session at a time that is different than a scheduled start time for the communication session.

Figure 6D:
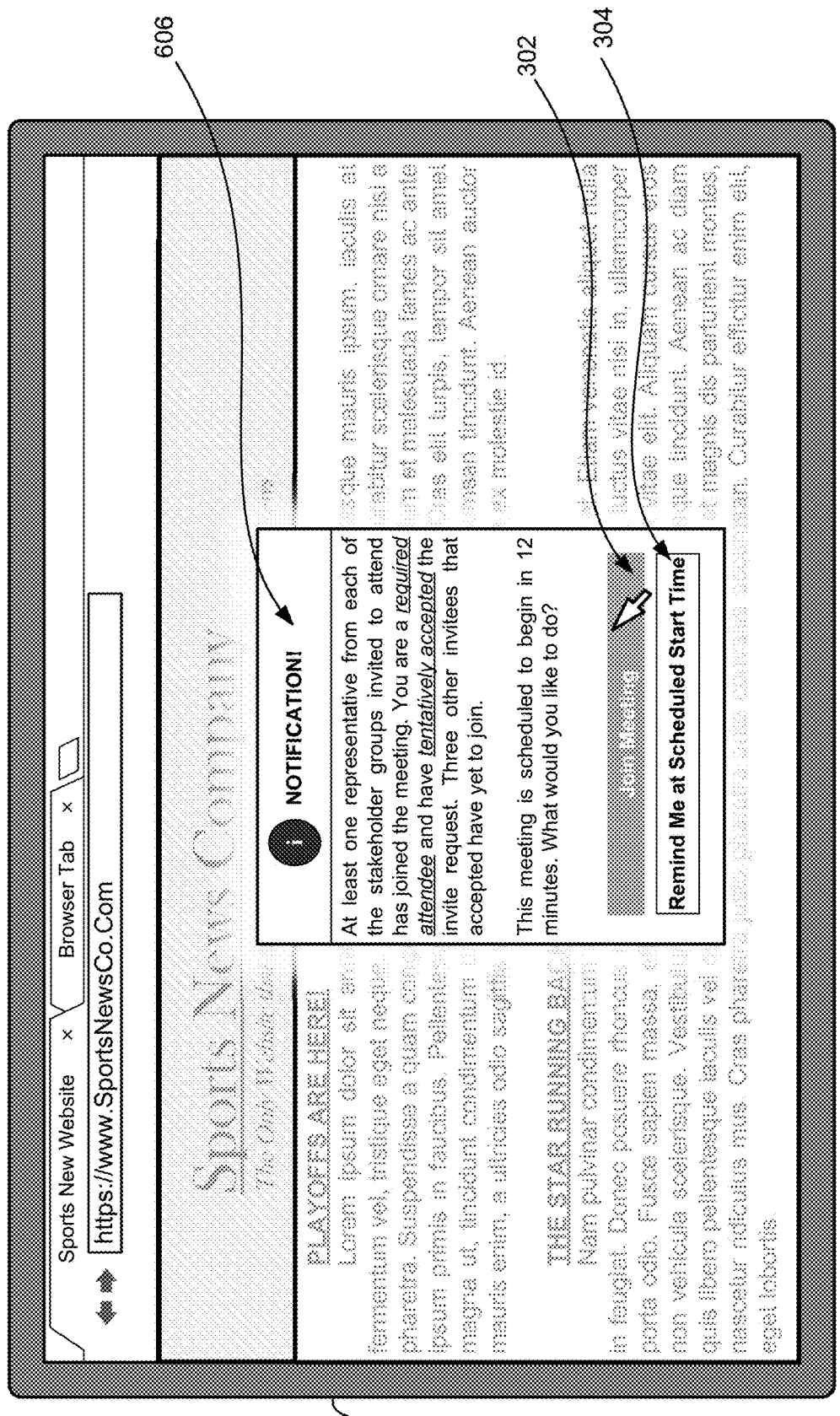

FIG. 6D illustrates an example notification user interface that displays a notification on a client device thereby informing a user that as least one representative from each of the different stakeholder groups invited to attend has joined a communication session at a time that is different than a scheduled start time for the communication session.

Figure 7:
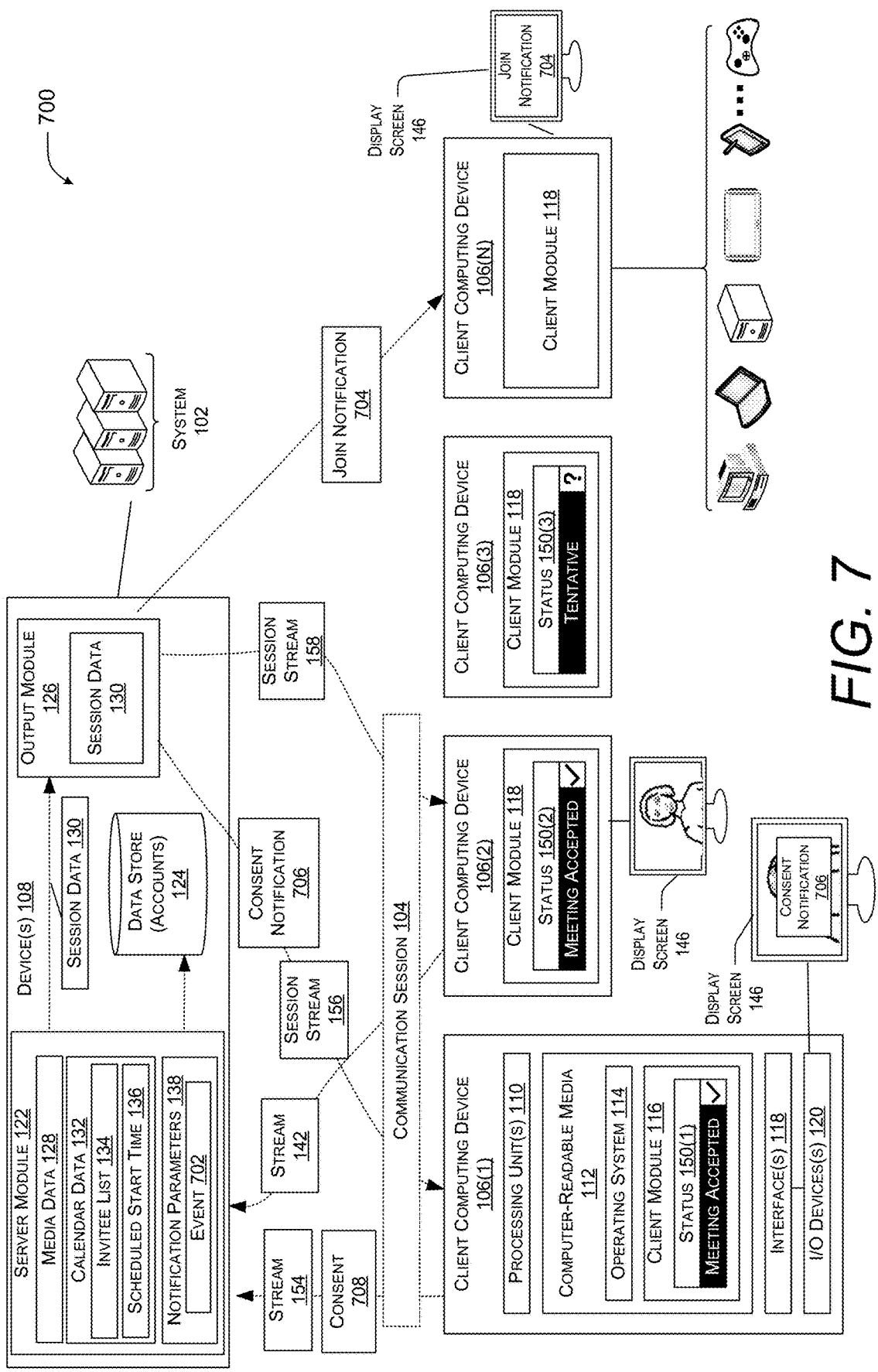

FIG. 7 is a diagram illustrating an example environment in which a system enables a user to join a communication session in response to receiving and viewing a notification informing the user of an event of interest that occurs in the communication session. The notification can be transmitted after consent is received from a user currently participating in the communication session.

Figure 8:
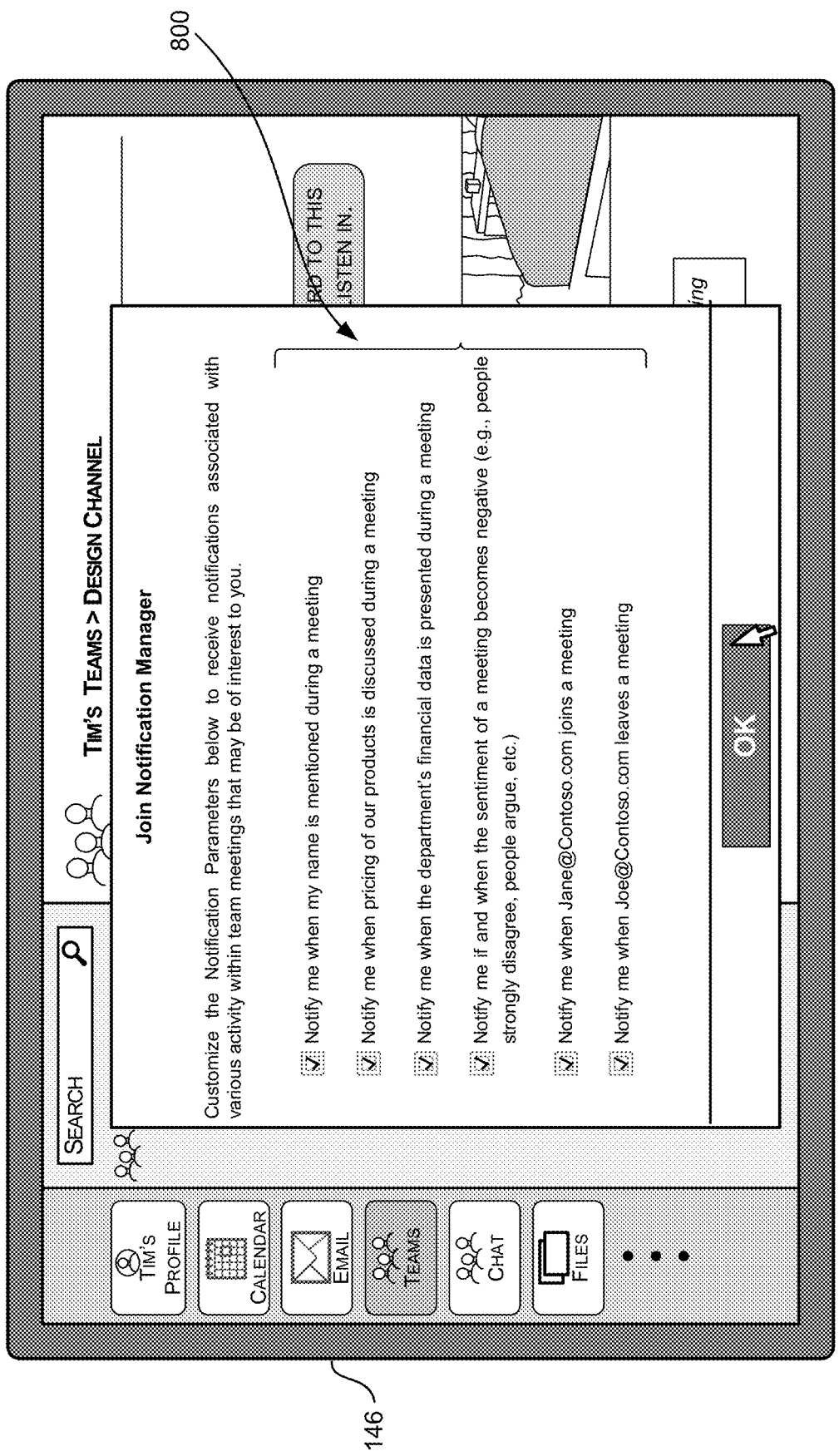

FIG. 8 illustrates an example join notification manager user interface that displays selectable options configured to transmit notifications to a user when an identification of the user is mentioned during a communication session, when a particular topic is discussed during a communication session, when content associated with a particular topic is presented during a communication session, when the sentiment of a meeting changes during a communication session, when a particular person joins a communication session, or when a particular person leaves a communication session.

Figure 9:
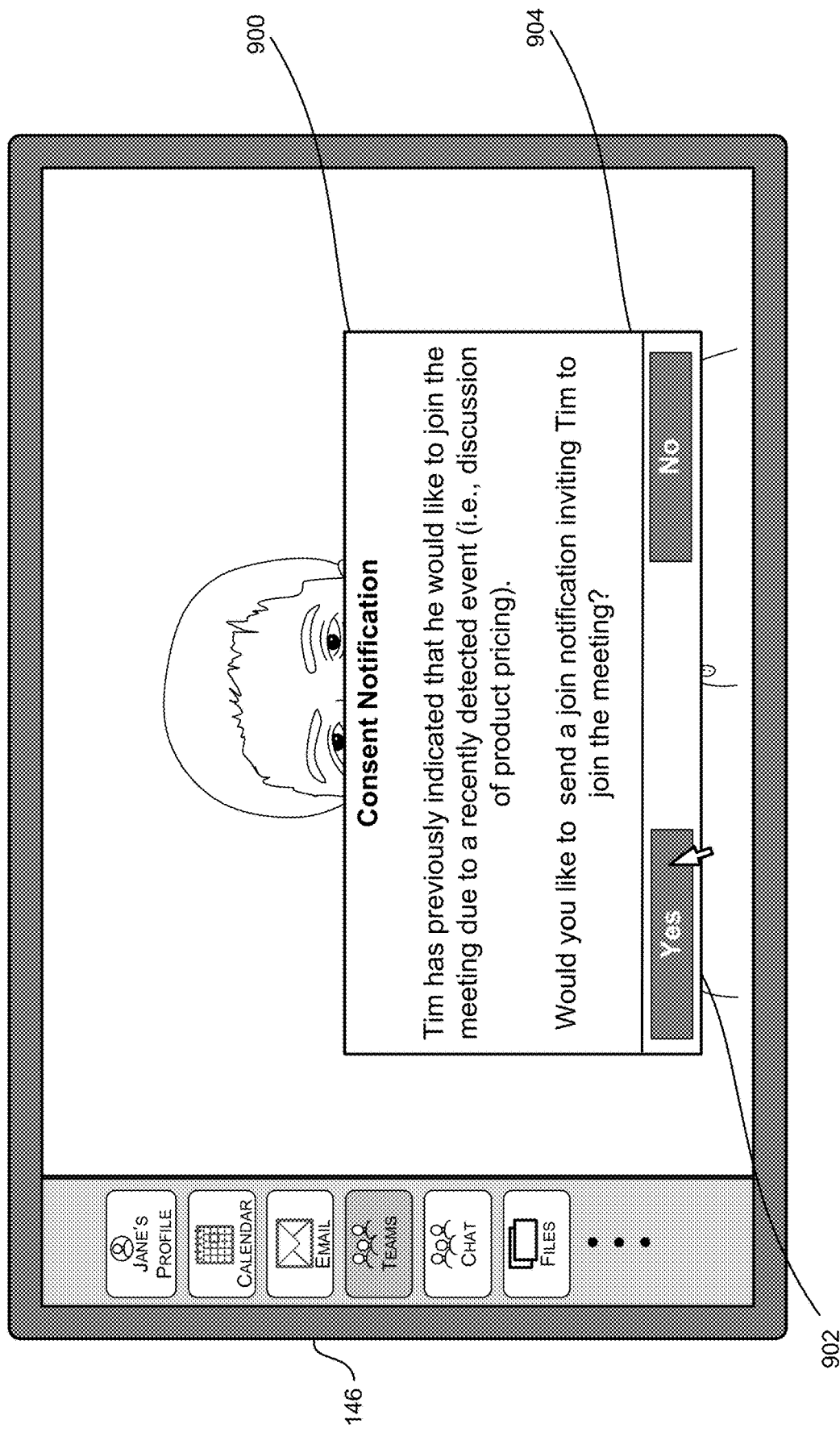

FIG. 9 illustrates an example consent notification user interface that displays a notification on a client device thereby informing a user that is already participating in a communication session that an event has occurred.

Figure 10A:
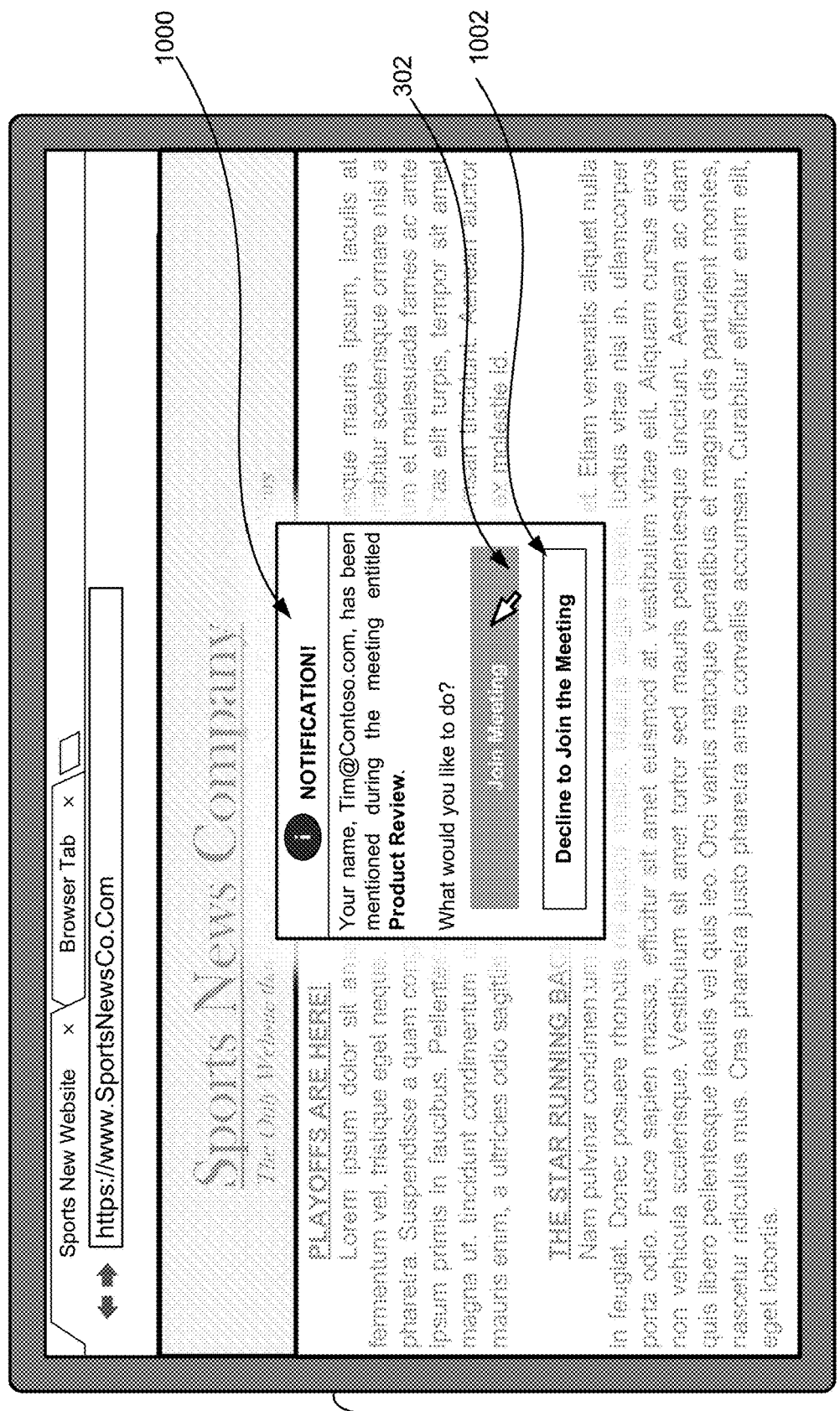

FIG. 10A illustrates an example notification user interface that displays a notification on a client device thereby informing a user that his or her name has been mentioned during the communication session.

Figure 10B:
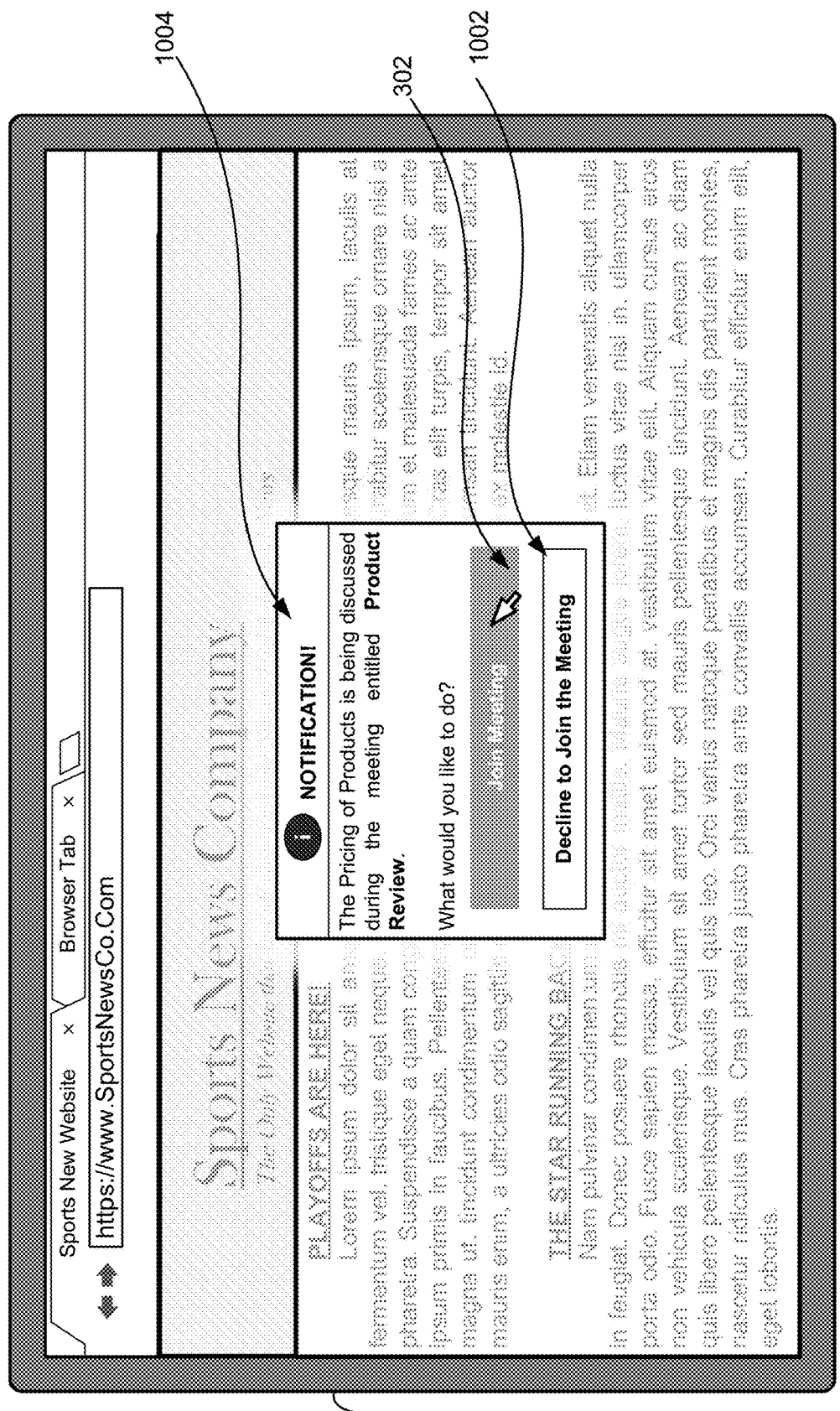

FIG. 10B illustrates an example notification user interface that displays a notification on a client device thereby informing a user that a particular topic is being discussed during the communication session.

Figure 10C:
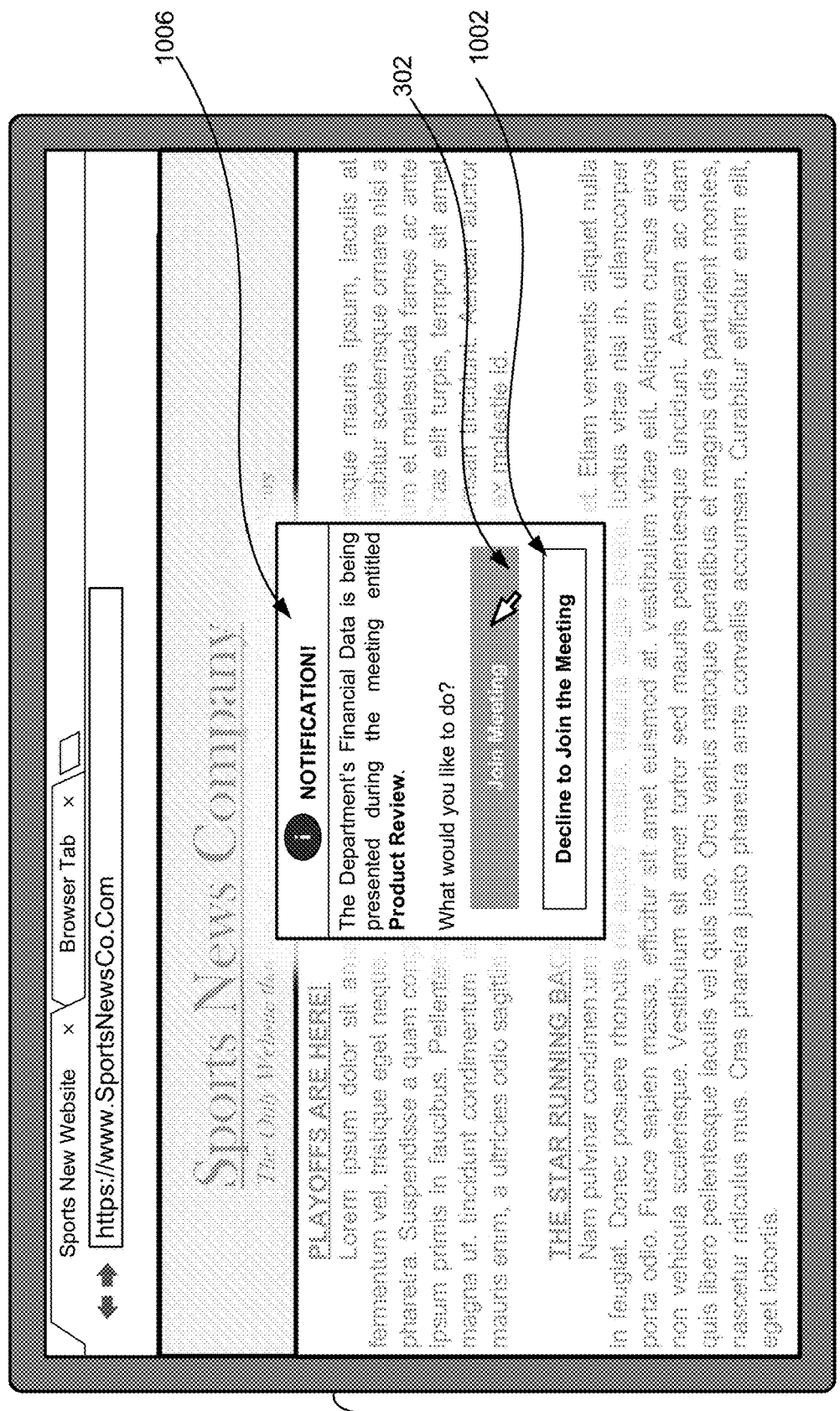

FIG. 10C illustrates an example notification user interface that displays a notification on a client device thereby informing a user that a particular topic is being presented during the communication session.

Figure 10D:
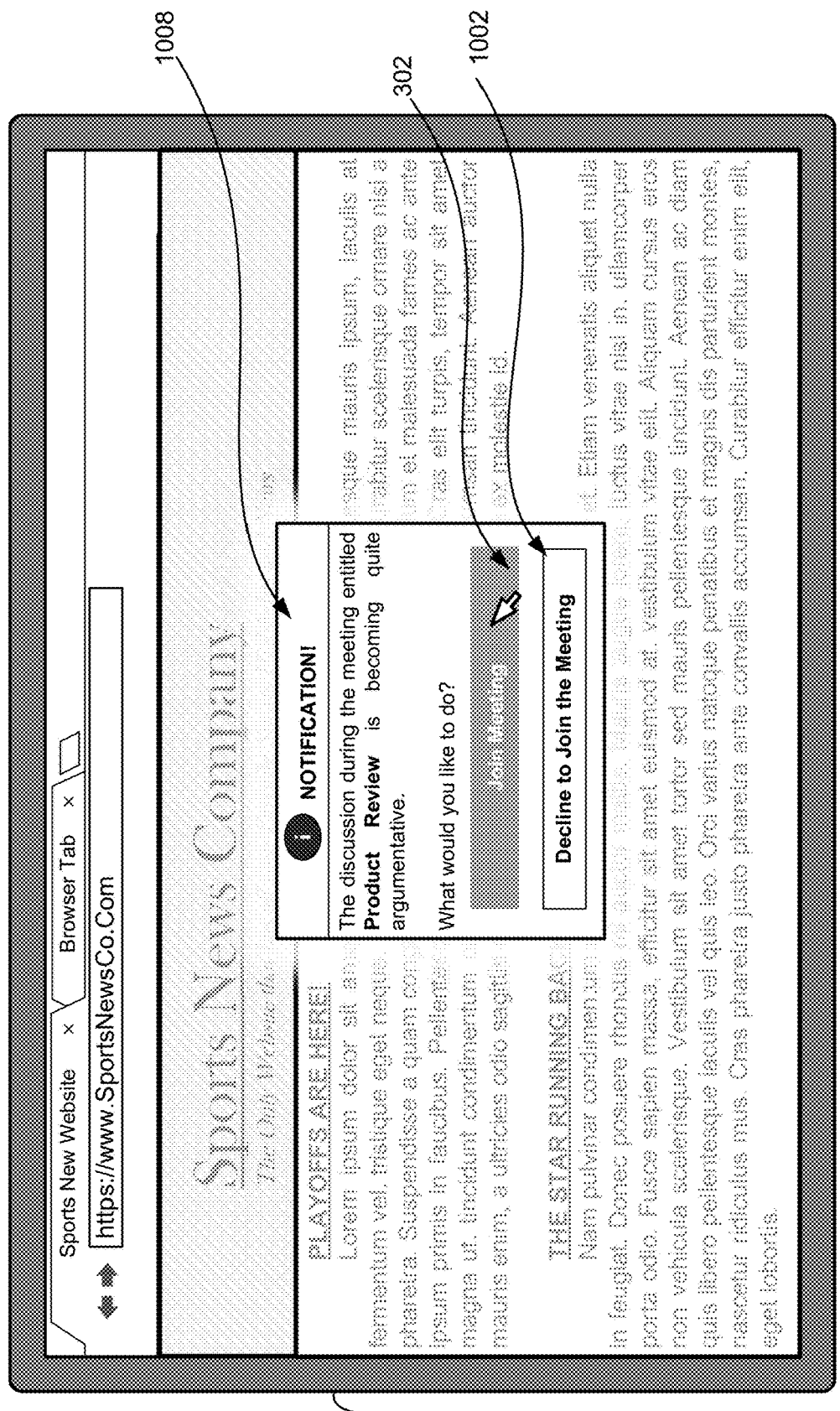

FIG. 10D illustrates an example notification user interface that displays a notification on a client device thereby informing a user that a group sentiment during the communication session is changing to a negative sentiment.

Figure 10E:
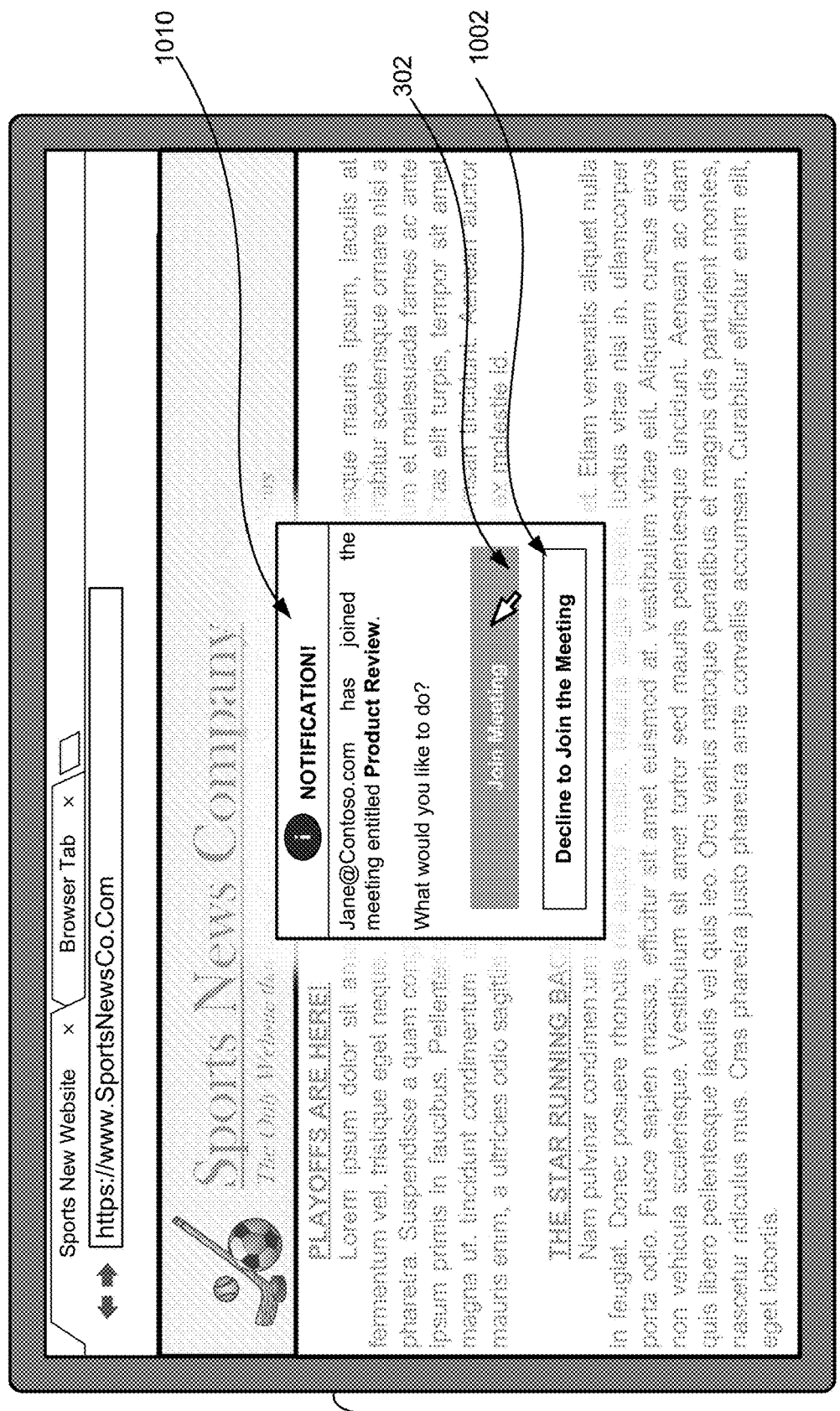

FIG. 10E illustrates an example notification user interface that displays a notification on a client device thereby informing a user that a particular user has joined the communication session.

Figure 10F:
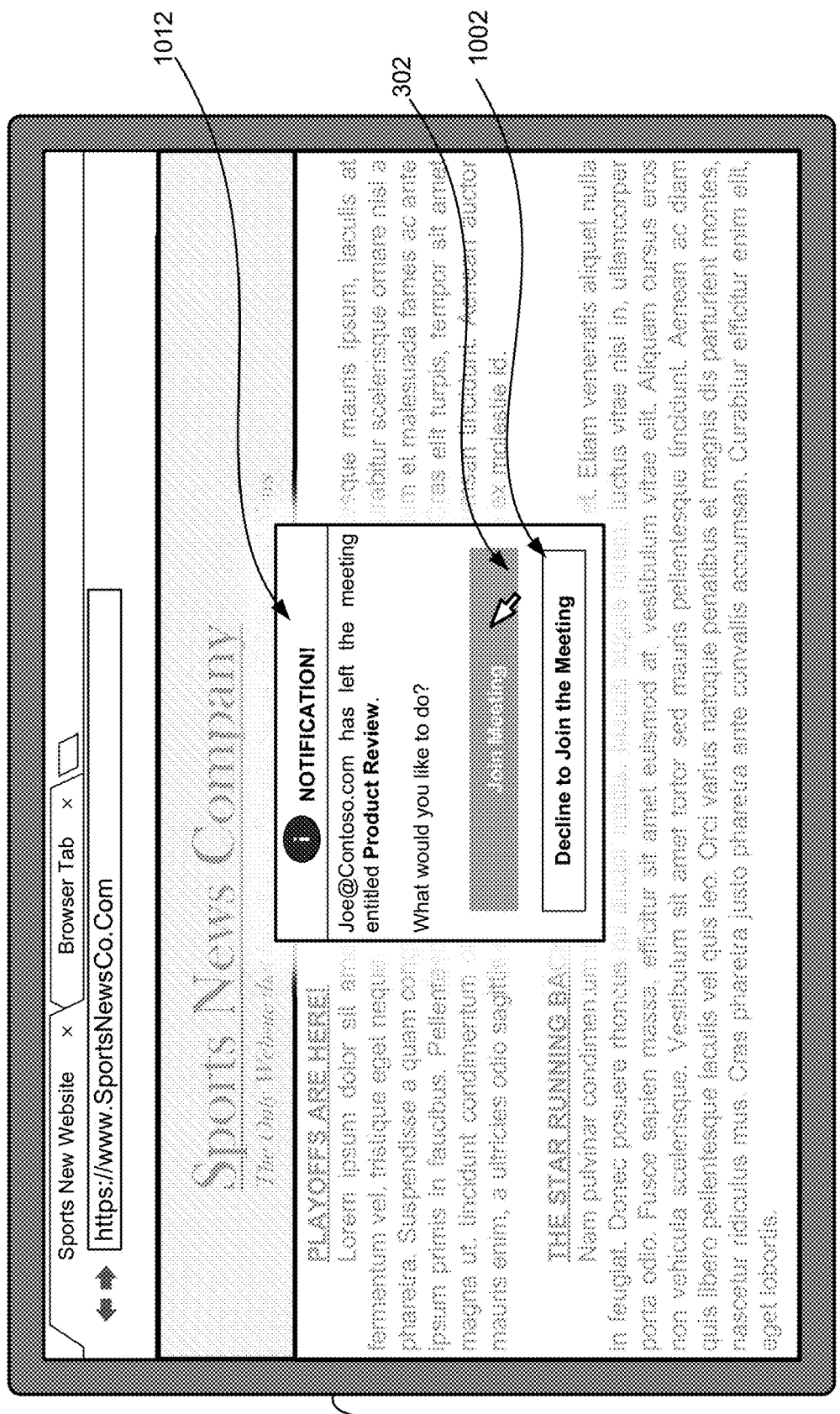

FIG. 10F illustrates an example notification user interface that displays a notification on a client device thereby informing a user that a particular user has left the communication session.

Figure 11:
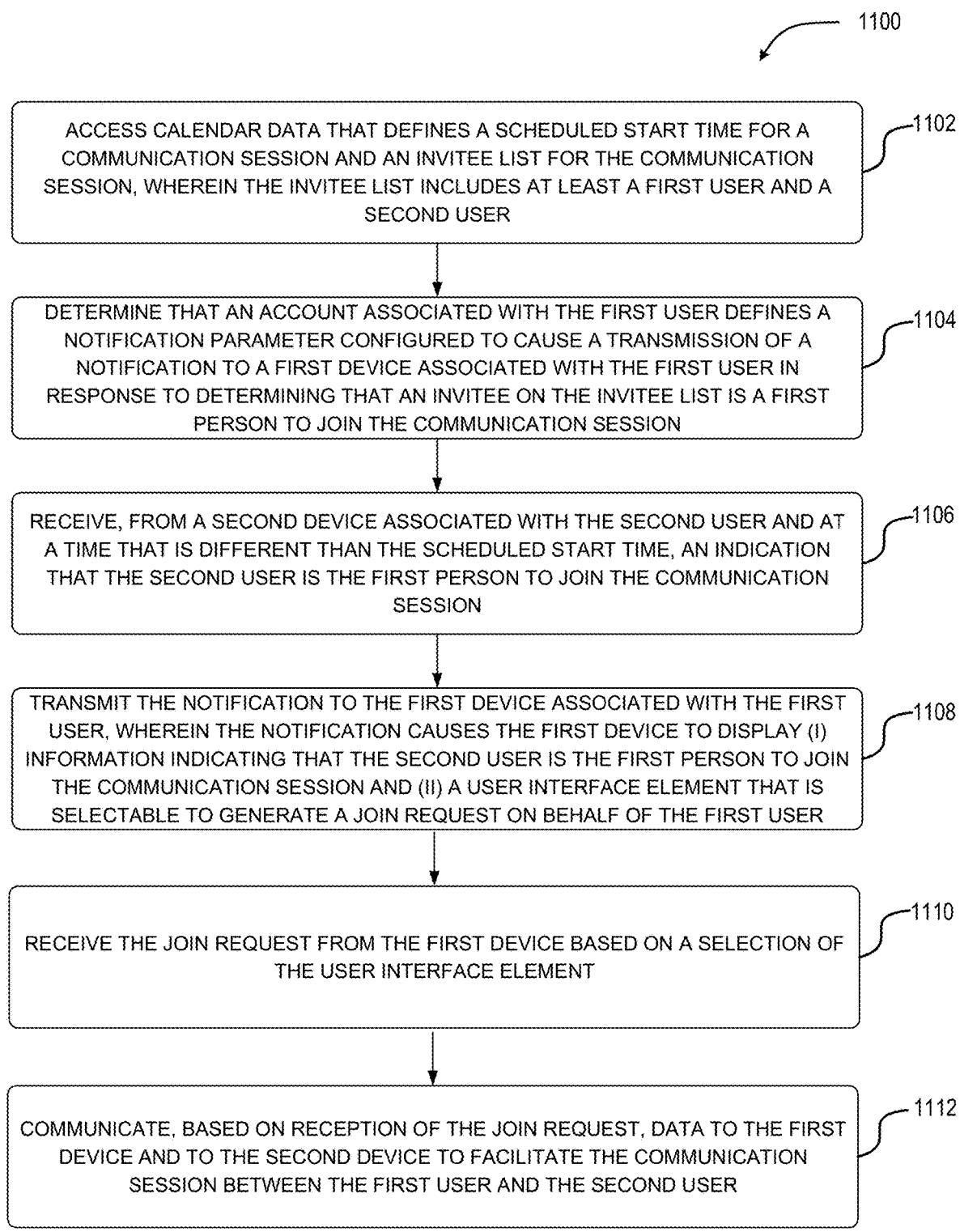

FIG. 11 illustrates a routine for transmitting and displaying a notification informing a user that another user is the first person to join a communication session at a time that is different than a scheduled start time for the communication session.

Figure 12:
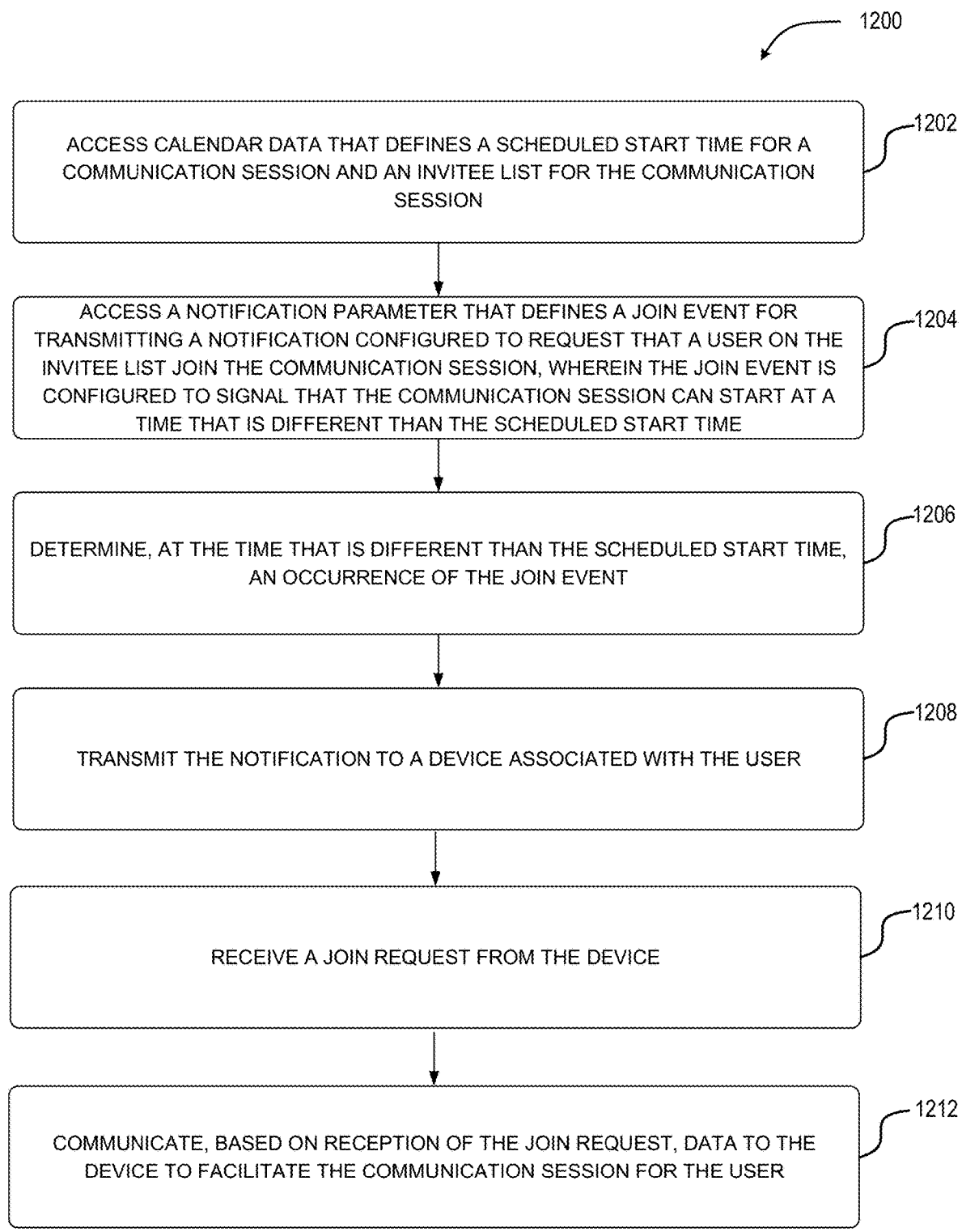

FIG. 12 illustrates a routine for transmitting and displaying a notification informing a user of a join event that occurs when an organizer of a communication session joins, when a required attendee is the first required attendee to join, when an external user is the first external user to join, or when a representative from each of a plurality of different stakeholder groups has joined the communication session.

Figure 13:
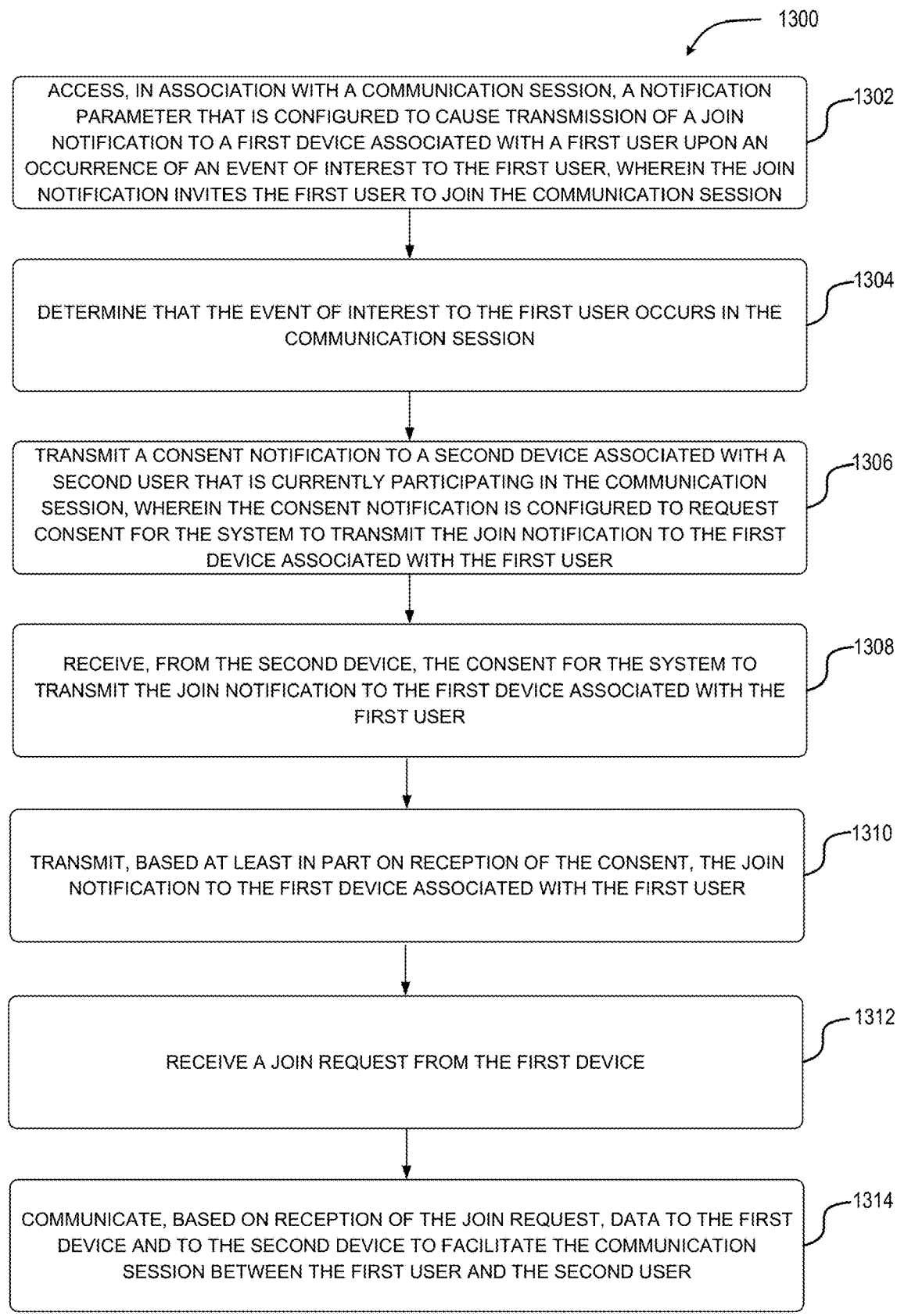

FIG. 13 illustrates a routine for transmitting and displaying a notification informing a user of an event of interest that occurs in a communication session. The notification can be transmitted after consent is received from a user currently participating in the communication session.

Figure 14:
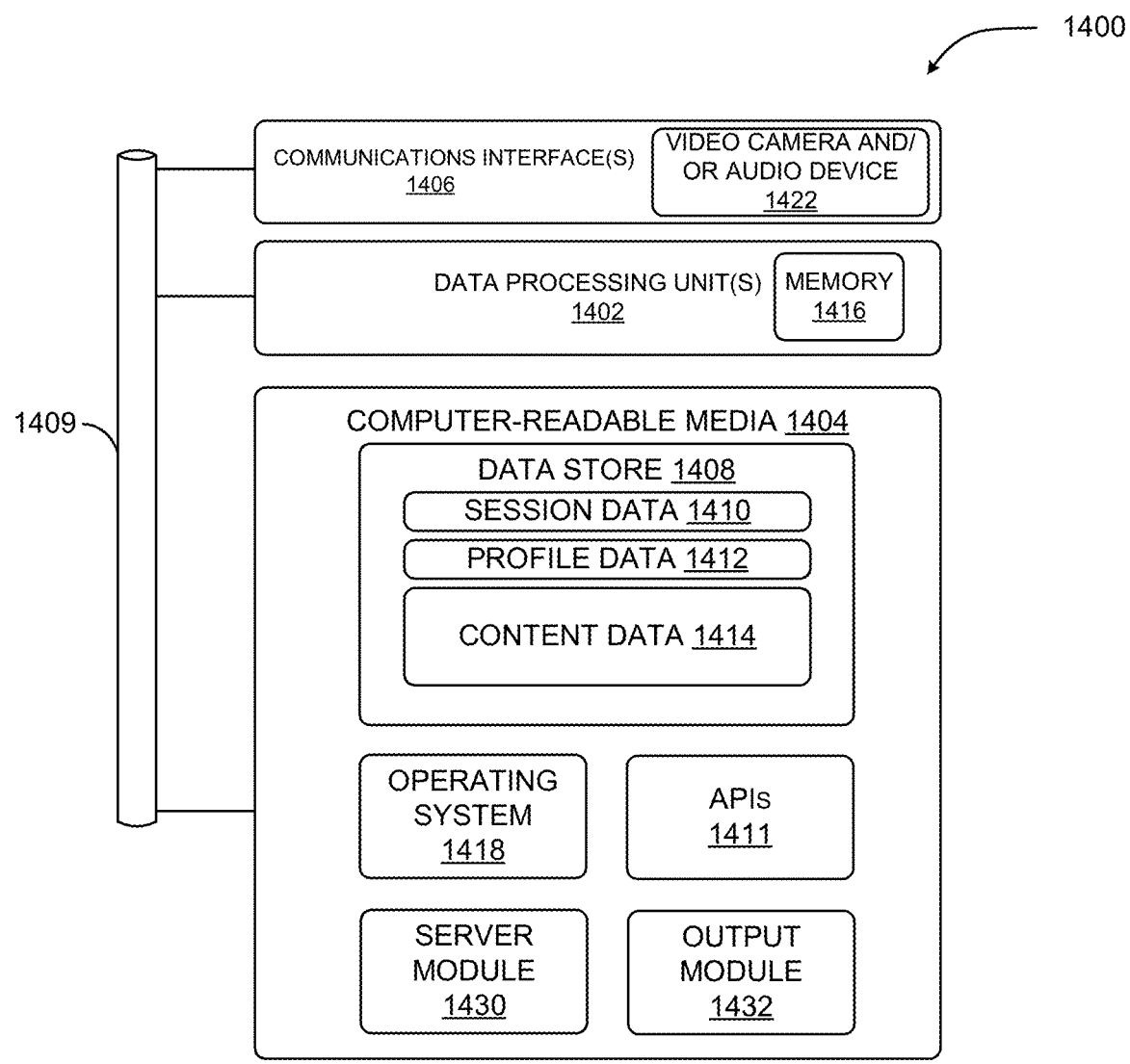

FIG. 14 is a computing system diagram showing aspects of an illustrative operating environment for the technologies disclosed herein.

DETAILED DESCRIPTION

The techniques disclosed herein describe a system for providing a notification to a user that has been invited to participate in a communication session. The notification is configured to inform the user of current contextual information associated with the meeting and to provide the user with an effective and efficient way to join the meeting. The notification can be provided based on occurrences of different types of join events signaling that a meeting may be able to start at a time that is different than a scheduled start time.

A first type of join event that can cause a notification to be transmitted can occur when a user on the invitee list of a meeting is the first person to join the meeting. Other types of join events can occur when users that are likely associated with some degree of importance join the meeting. For example, these other types of join events can occur when an organizer of the meeting joins the meeting, when a required attendee is the first required attendee to join the meeting, when an external user is the first external user to join the meeting, or when a representative from each of a plurality of different stakeholder groups has joined the meeting.

The techniques described herein provide a technical improvement over conventional systems at least because an amount of time a user spends on his or her device waiting for another user to join a meeting can be reduced if other user(s) join the meeting before a scheduled start time. Moreover, a user can continue to work on his or her own tasks after a scheduled start time for a meeting knowing that he or she will be notified when the meeting is likely able to start (e.g., the first person joins the meeting, the organizer joins the meeting, a required attendee joins the meeting, etc.).

Figure 1A:
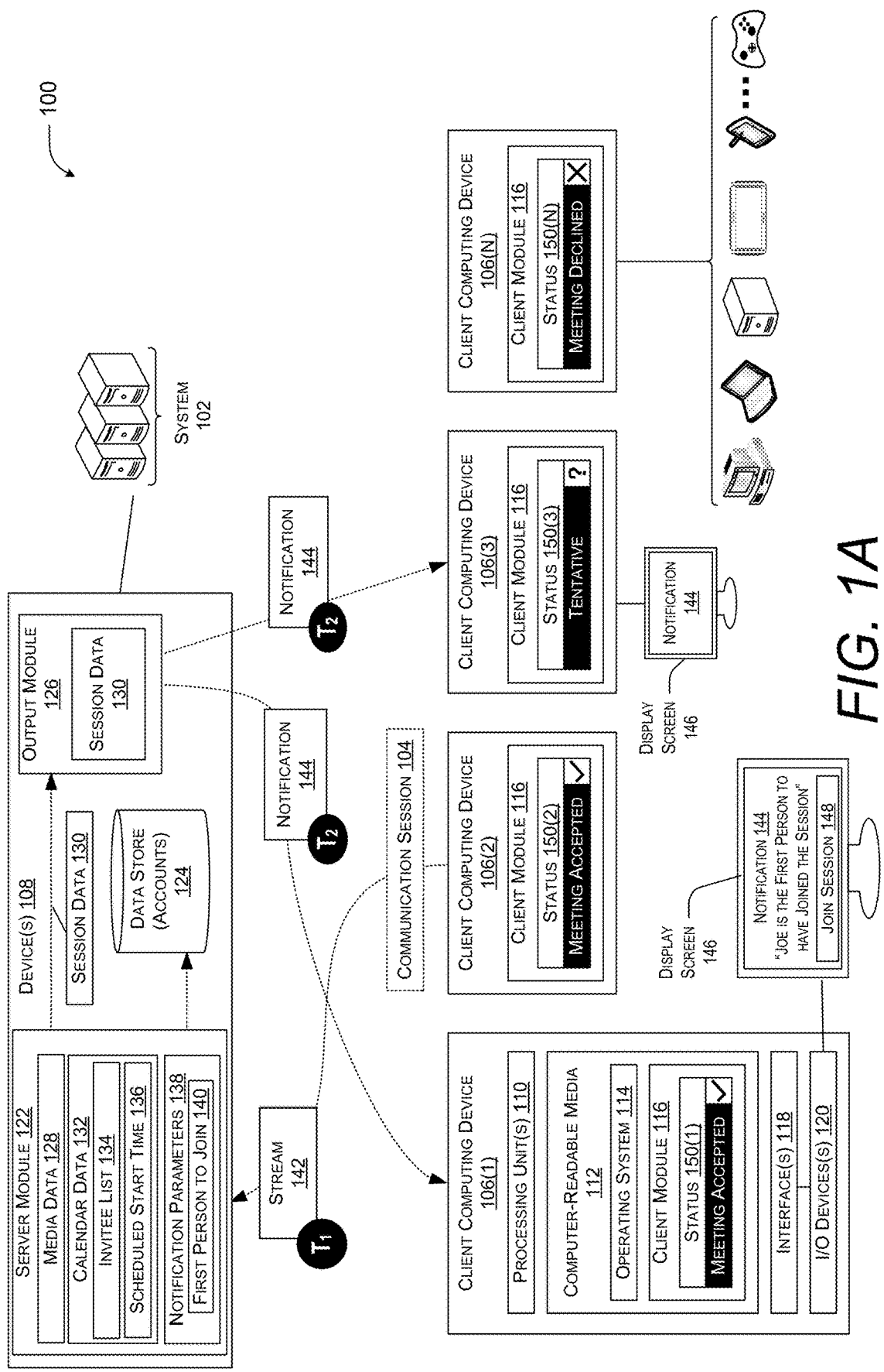
FIG. 1A is a diagram illustrating an example environment in which a system can operate to provide a notification to a user that has been invited to participate in a communication session, the notification informing the user that another user is the first person to join the communication session at a time that is different than a scheduled start time for the communication session.

FIG. 1A is a diagram illustrating an example environment 100 in which a system 102 can operate to provide a notification to a user that has been invited to participate in a communication session 104. As described above, the notification is configured to inform the user of current contextual information associated with the communication session 104 and to provide the user with an effective and efficient way to join the communication session 104.

In the example of FIG. 1A, the notification can inform the user that an invitee on an invitee list is the first person to join the communication session 104. The communication session 104 can be a live, virtual meeting that is being implemented between a number of client computing devices 106(1-N) (may be referred to herein as a "client device"). The communication session 104 can be hosted, over one or more network(s), by the system 102. That is, the system 102 can provide a service that enables users of the client devices 106(1-N) to participate in, or attend, the communication session 104. Consequently, a "participant" to, or an "attendee" of, the communication session 104 can comprise a user and/or a client device that have been invited to join the communication session 104, each of which can communicate with other participants. A user can "join" a communication session by using an account and/or device configured to initiate the transmission and reception of data streams. In some instances, multiple users may be in a conference room participating in the communication session 104 via the use of a single client device. As an alternative, the communication session 104 can be hosted by one of client devices 106(1-N) utilizing peer-to-peer technologies.

The system 102 includes device(s) 108 such as a server. The device(s) 108 and/or other components of the system 102 can include distributed computing resources that communicate with one another and/or with the client devices 106(1-N) via the one or more network(s). In some examples, the system 102 may be an independent system that is tasked with managing aspects of the communication session 104. As an example, the system 102 may include components and modules for managing a service such as MICROSOFT TEAMS, AMAZON CHIME, SLACK, GOOGLE HANGOUTS, WEBEX, etc.

Client devices 106(1-N) can represent any type of computing device having one or more processing unit(s) 110 operably connected to computer-readable media 112. Executable instructions stored on computer-readable media 112 may include, for example, an operating system 114, a client module 116, and/or other modules, programs, or applications that are loadable and executable by processing units(s) 110.

Client devices 106(1-N) may also include one or more interface(s) 118 to enable network communications between client devices 106(1-N) and other networked devices, such as device(s) 108. Such interface(s) 118 may include one or more network interface controllers (NICs) or other types of transceiver devices to send and receive communications and/or data over a network. Moreover, client devices 106(1-N) can include input/output ("I/O") interfaces that enable communications with input/output devices 120 such as user input devices including peripheral input devices (e.g., a game controller, a keyboard, a mouse, a pen, a voice input device such as a microphone, a touch input device such as a touch screen display, a gestural input device, and the like) and/or output devices including peripheral output devices (e.g., a display, a printer, audio speakers, a haptic output device, and the like).

In the example environment 100 of FIG. 1A, client devices 106(1-N) are configured to use their respective client modules 116 to connect with one another and/or other external device(s) in order to participate in the communication session 104. When deploying functionality of client modules 116, the users may share data, which may cause client device 106(1) to connect to the system 102 and/or the other client devices 106(2-N) over a network. Users may use the client module 116 of their respective client devices 106(1-N) to generate participant profiles and provide the participant profiles to other client devices and/or to the device(s) 108 of the system 102. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions, invite users to participate in communication sessions, and/or to identify which particular user is associated with particular notification parameters, as further described herein. A participant profile may further include a user representation such as, for example, a photograph of the particular user, an avatar embodiment of the particular user (e.g., a cartoon graphic resembling the user), and/or any other icon or figure suitable for graphically representing the particular user (e.g., an image of an automobile or an inanimate object).

As shown in FIG. 1A, the device(s) 108 of the system 102 include a server module 122, a data store 124, and an output module 126. The server module 122 is configured to collect media data 128 based on incoming streams from various client devices 106(1-N) in order to generate session data 130 that can be provided by the output module 126 to the participants in the communication session 104. In order to host the communication session 104, the server module 122 has access to calendar data 132. The calendar data 132 can include, for example, an invitee list 134 for the communication session 104 (e.g., identifications for the users of client devices 106(1-N)) and a scheduled start time 136 for the communication session 104.

In some configurations, the invitee list 134 can include a group of users that belong to a team or that follow a channel. Such users can be invited to join a team prior to the scheduling of the communication session 104. In some implementations, data associated with the team, such as related messages and/or chat discussions, cannot be accessed by a user unless the user receives an invitation and accepts the invitation to join the team. Once a user joins a team, that user can follow various channels associated with the team. A channel can be defined by the users of the team, or a subset of the user of the team, to share information associated with particular subject matter. Consequently, the communication session 104 can be provisioned in association with a team and/or a channel to enable the users to communicate in real time. For instance, a user may announce a public meeting and/or provide access to the public meeting via a calendar meeting object that is added to a channel. Accordingly, users on the team and/or users that follow the channel are users that are on the invitee list 134, and therefore, are users that can receive the notifications described herein.

In various embodiments, the server module 122 is configured to access notification parameters 138 in association with hosting a communication session 104. A notification parameter 138 can define a join event that signals that a communication session 104 may be able to start at a time that is different than a scheduled start time 136.

In the example of FIG. 1A, the type of join event is associated with a user (any user) on the invitee list 134 of the communication session 104 being the first person to join 140 the communication session 104. As illustrated in FIG. 1A, the user of client device 106(2) is the first person to join the communication session 104 by initiating transmission, to the system 102 and a time $T_1$, of a media stream 142. In one example, the media stream 142 that captures audio and/or visual data of the user of client device 106(2). On the other side, the server module 122 receives an indication that the user of client device 106(2) has joined, or has requested to join, the communication session based on access to the media stream 142 provided by client device 106(2).

The user of client device 106(2) may join the communication session 104 at a time $T_1$ that is before or after the scheduled start time 136 for the communication session 104. When the user of client device 106(2) joins, the server module 122 is configured to register the join action, determine that the user of client device 106(2) is the first person to join, and generate a notification 144 based on a notification parameter 148.

The notification 144 can be passed to the output module 126 as part of the session data 130 so that it can be transmitted by the output module 126 to devices of other users on the invitee list 134 that have yet to join the communication session 104 at a time $T_2$ that is after $T_1$. In one example, the notification 144 can identify the user of client device 106(2) (e.g., "Joe") as the first person to have joined the communication session 104. As shown on the display screen 146 of client device 106(1) in FIG. 1A, the notification 144 states that "Joe is the first person to have joined the session". Consequently, the other users (e.g., the users of client device 106(1) and 106(3)) invited to attend the communication session 104 can be made aware that at least one person has joined the communication session 104.

In some embodiments, the notification 144 may include a user interface element 148 that enables a user to immediately join the communication session 104. In this way, if a user that is planning to meet with another user at a scheduled time decides, prior to the scheduled time, that an earlier meeting time is more convenient, the user can simply join the communication session 104 early and the other user will be notified that the communication session 104 has been initiated by the user. If that earlier meeting time is suitable for the other user, then the other user can immediately join the communication session 104.

In various examples, a user can define a notification parameter 138 so that he or she controls if and when a join notification pops up with respect to a communication session 104 to which the user has been invited. An example of this is illustrated in the graphical user interface of FIG. 2. Accordingly, the notification parameters 138 can be stored in user accounts in a data store 124 and the server module 122 can access the data store 124 to retrieve notification parameters 138 for users on the invitee list 134 for the communication session 104. The user accounts can include data (e.g., a participant profile, defined notification parameters, etc.) received from a client module 116. Alternatively, the notification parameters 138 can be default settings defined by the system 102 or an administrator of a user account.

In further examples, the notification parameter 138 can define various conditions that must be satisfied in order for the notification 144 to be generated and transmitted. For instance, a condition may be associated with a predetermined acceptance status for a user. As illustrated in FIG. 1A, the client modules 116 of the client devices 106(1-N) have respective statuses 150(1-N). That is, the user of client device 106(1) has accepted the invitation to the communication session 104, the user of client device 106(2) has accepted the invitation to the communication session 104 and has already joined the communication session 104 via media stream 142, the user of client device 106(3) has tentatively accepted the invitation to the communication session 104, and the user of client device 106(N) has declined the invitation to the communication session 104. A condition may require that the user has accepted, or tentatively accepted, an invitation in order for the output module 126 to transmit the notification 144 upon detecting that a first person has joined the communication session 104. Accordingly, the notification 144 is sent to client devices 106(1) and 106(3). However, the notification 144 is not sent to client device 106(N). Rather, the status indicating that the user of client device 106(N) declined the invite to the communication session 104 prevents the output module 126 from sending the notification 144 to client device 106(N). In some instances, a condition may permit the notification 144 to be sent to a user who has not responded to the invite (e.g., a user that has neither accepted, tentatively accepted, nor declined the invite). This user may be someone who is on a team and/or who follows a channel, and thus, may qualify to receive a notification when a first person joins a communication session 104 associated with the team and/or channel.

Figure 1B:
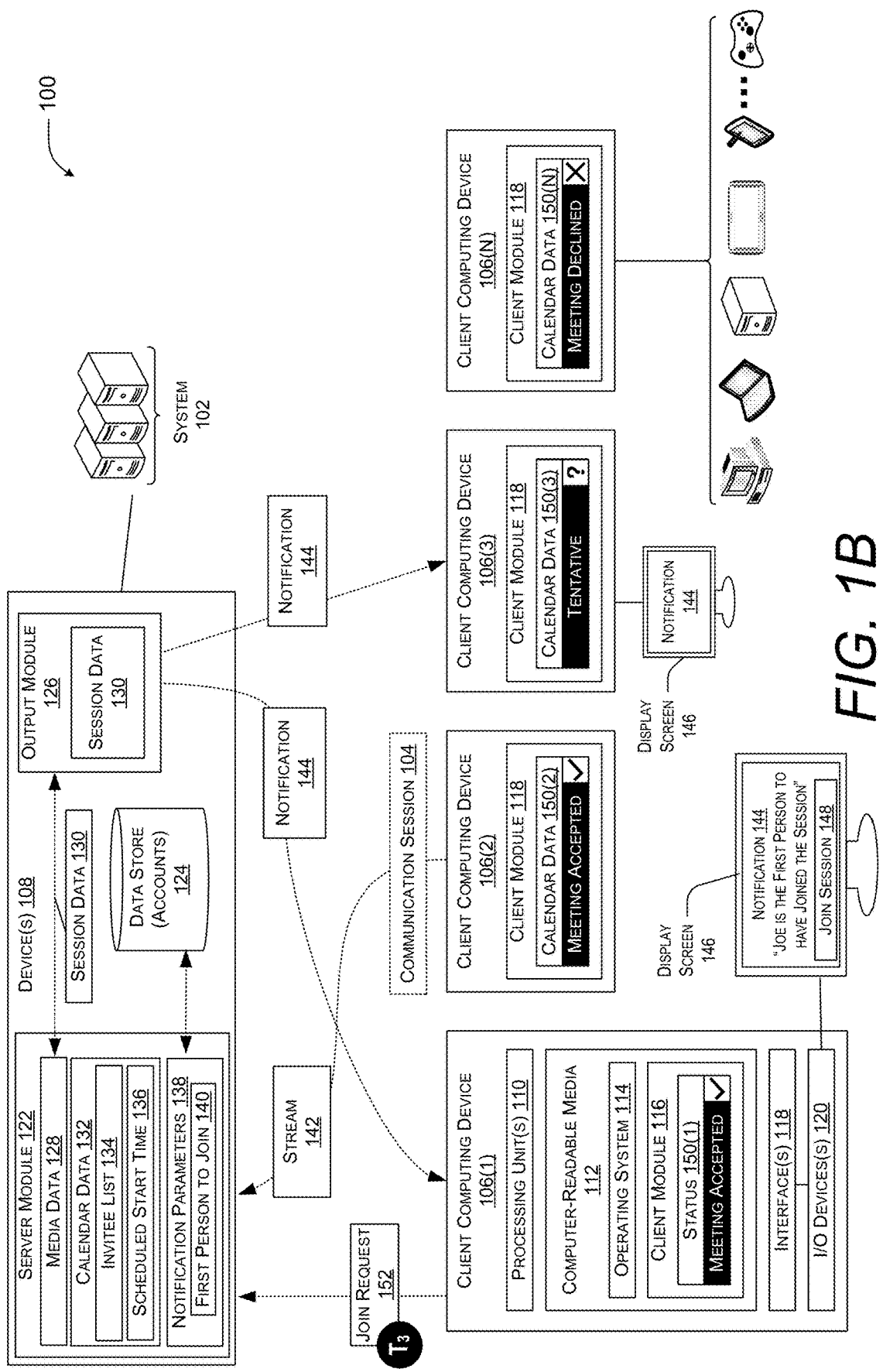
FIG. 1B is a diagram illustrating an example environment in which a system enables a user to efficiently transmit a request to join a communication session in response to receiving and viewing a notification informing the user that another user is the first person to join the communication session at a time that is different than a scheduled start time for the communication session.

Turning to FIG. 1B, the example environment 100 captures a scenario in which the user of client device 106(1) has been made aware that the user of client device 106(2) (i.e., "Joe") has joined the communication session 104 at a time that is different than the scheduled start time 136. With this knowledge, and if his or her schedule allows, the user of client device 106(1) can initiate a join request 152, at time $T_3$ which is after $T_1$ and $T_2$, based on selection of the user interface element 148.

Figure 1C:
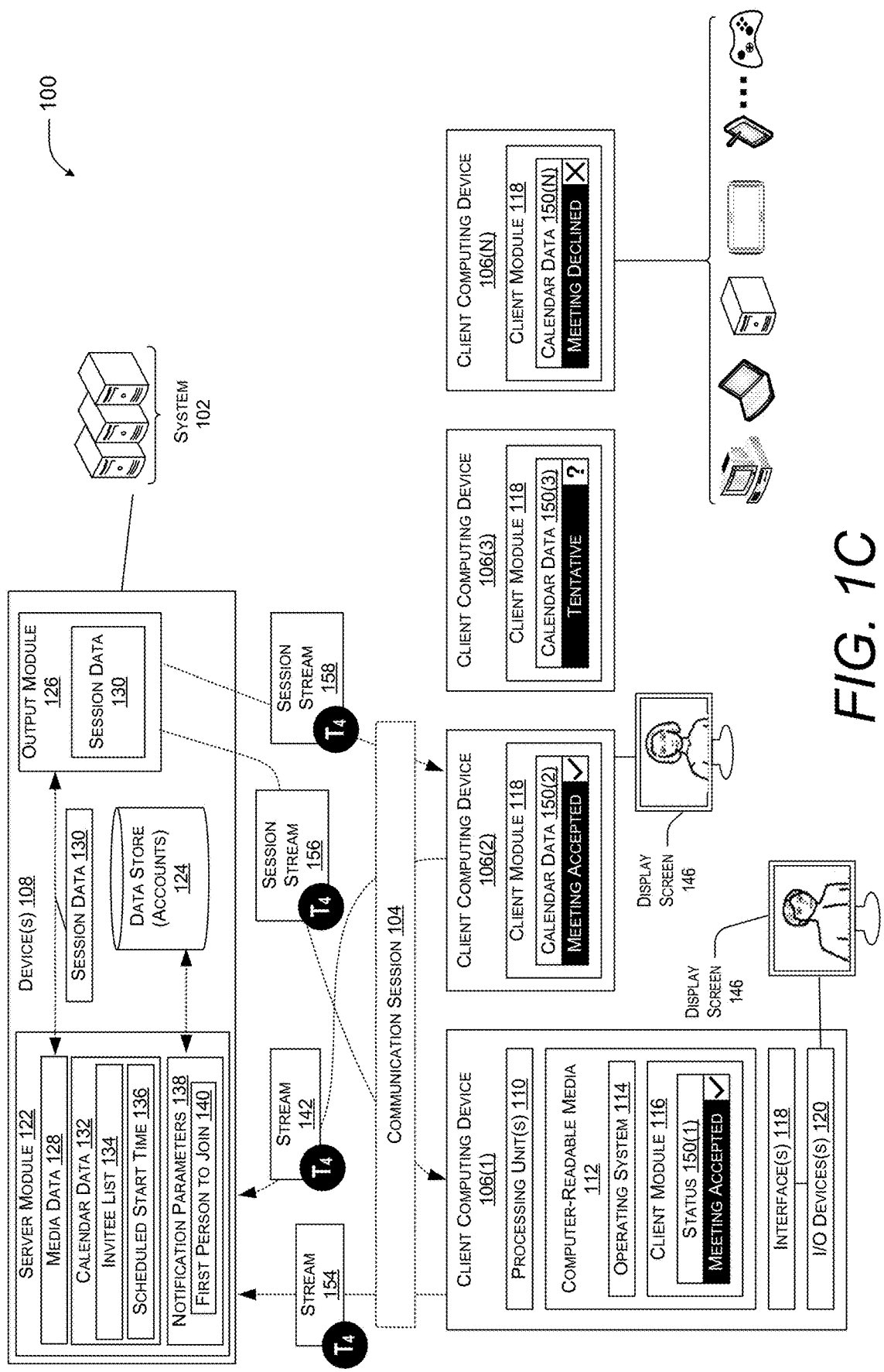
FIG. 1C is a diagram illustrating an example environment in which a system enables a user to join a communication session in response to receiving and viewing a notification informing the user that another user is the first person to join the communication session at a time that is different than a scheduled start time for the communication session.

Turning now to FIG. 1C, the example environment 100 illustrates that the user of client device 106(1) has been added to the communication session 104 via the join request 152 in FIG. 1B. Thus, client device 106(1) is now providing its own media stream 154 to the server module 122 at a time $T_4$, which is after $T_1$, $T_2$, and $T_3$. At the same time or at about the same time, both client devices 106(1) and 106(2) are receiving session streams 156 and 158 from the output module 126 based on the session data 130. The session streams 156 and 158 include data that facilitates the communication session between the users of the client devices 106(1) and 106(2). For instance, video data of the user of client device 106(2) may be shown on the display screen 146 of client device 106(1). Conversely, video data of the user of client device 106(1) may be shown on the display screen 146 of client device 106(2).

Figure 2:
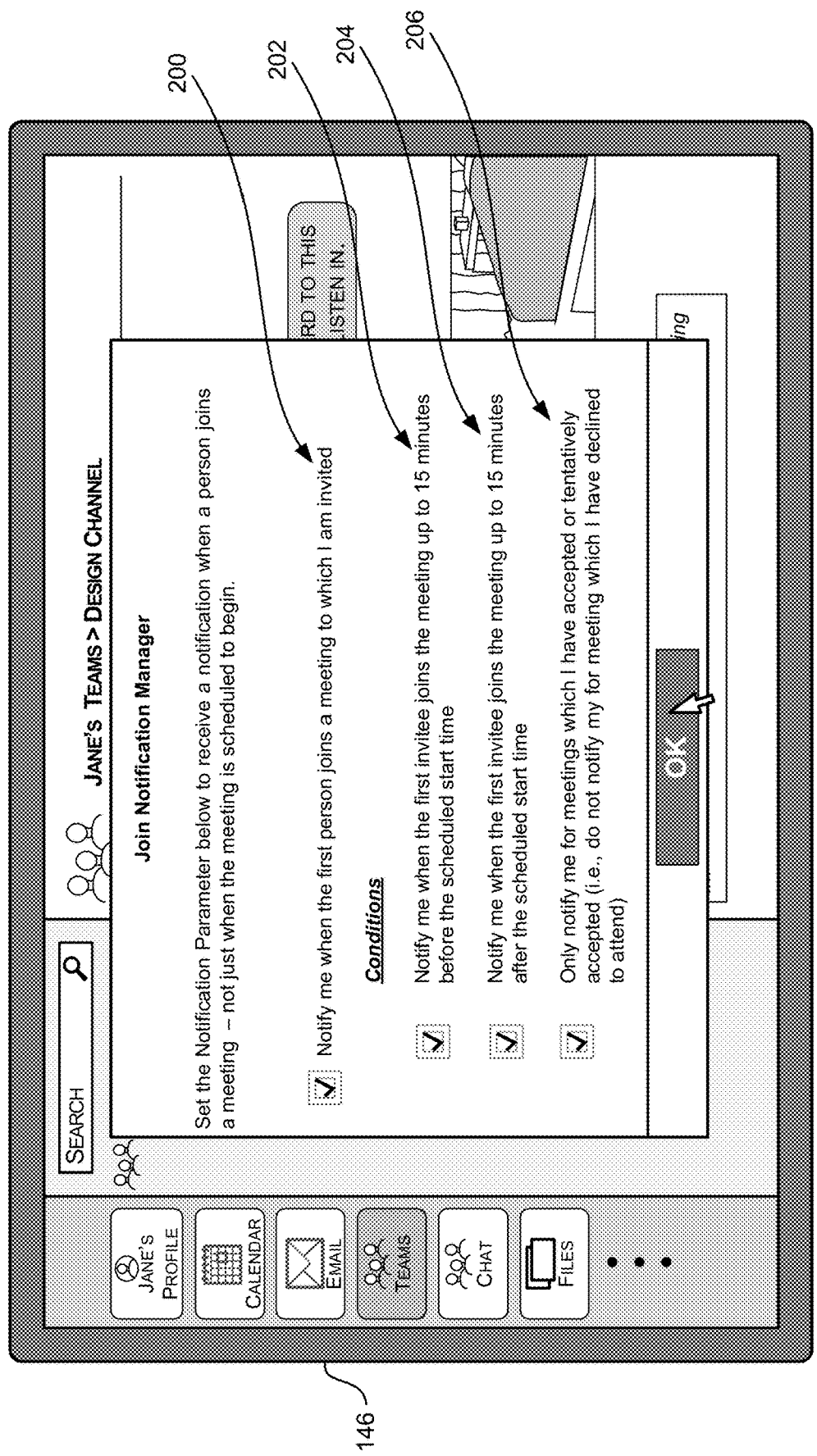
FIG. 2 illustrates an example notification manager user interface that displays a selectable option configured to transmit a notification to a user when a first person joins a communication session.

FIG. 2 illustrates an example join notification manager user interface that displays a selectable option 200 configured to transmit a notification to a user when a first person joins a communication session. More specifically, the join notification manager user interface enables, via the selectable option 200, the user to set a notification parameter 138 which causes the system 102 to monitor events associated with a scheduled communication session 104, detect when the first join event for the communication session 104 occurs, and then notify the user that the first person has joined the communication session 104.

In some embodiments, the user can further define conditions that must be satisfied before a notification can be transmitted. As shown in FIG. 2, a user may require that a current time needs to be within a threshold time range from the scheduled start time for the communication session 104 (e.g., fifteen minutes before 202 and/or fifteen minutes after 204) in order for the notification to be transmitted. Accordingly, these conditions may prevent the notification from being transmitted at the time the join event occurs if the time the join event occurs is more than fifteen minutes before the scheduled start time or more than fifteen minutes after the scheduled start time. Another condition may require the user to have accepted and/or tentatively accepted an invite 206 to the communication session 104 in order for a notification 144 to be generated and transmitted.

Figure 3:
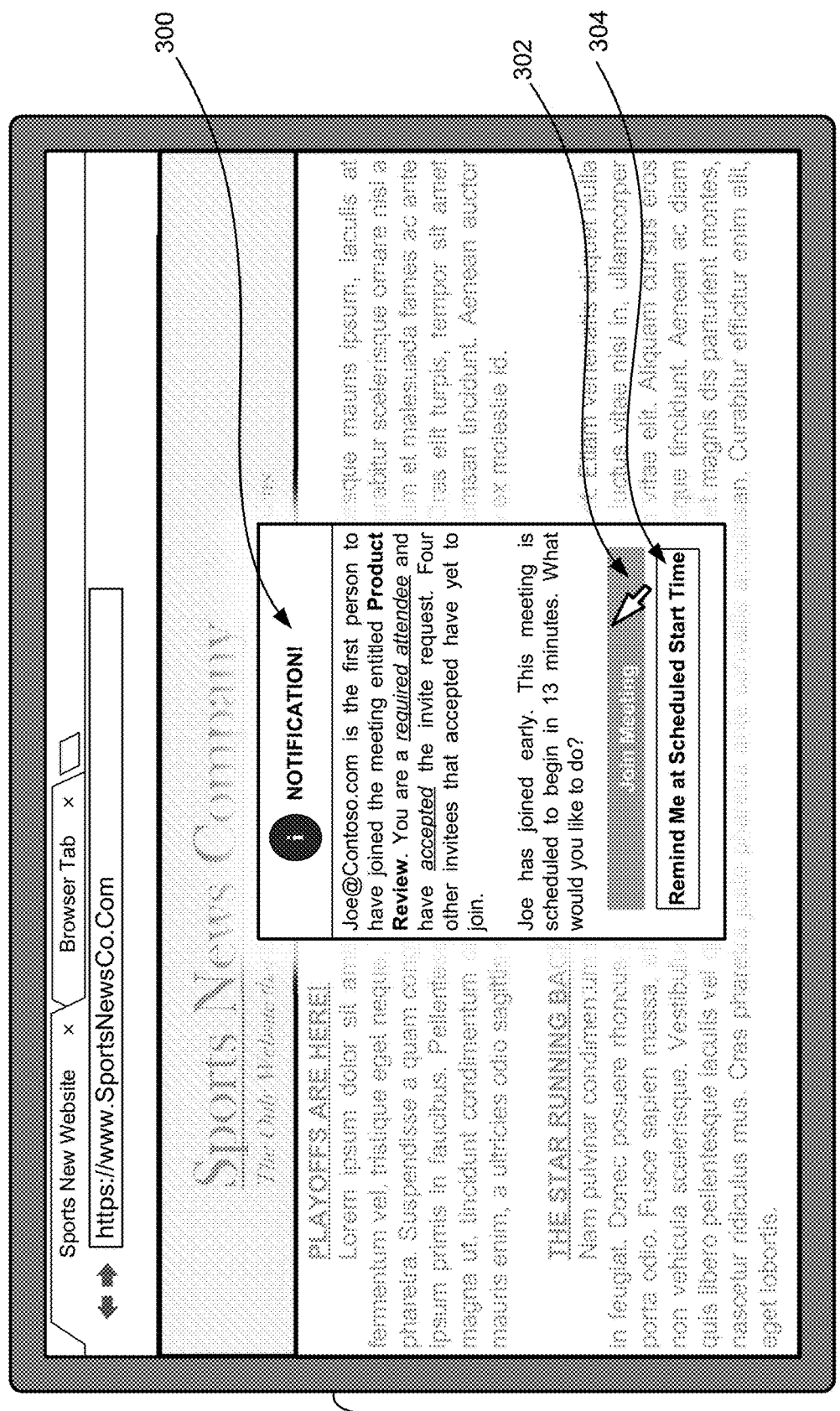
FIG. 3 illustrates an example user interface that displays a notification informing a user that another user is the first person to join a communication session at a time that is different than a scheduled start time for the communication session.

FIG. 3 illustrates an example notification user interface that displays a notification 300 on a client device thereby informing a user that another user is the first person to join a communication session 104 at a time that is different than a scheduled start time 136 for the communication session 104. As illustrated, the notification 300 is informing the user, or a viewer, of an identification (e.g., "Joe@Contoso.com") of the first person to join a meeting entitled "Product Review". In various implementations, the notification 300 may be in the form of a pop-up type notification that is generated in a foreground of (e.g., superimposed over) one or more other applications being operated on the client device by the user. In the illustrated example, the user is using an application that is neither specifically associated with the communication session 104 nor the system 102 (e.g., the user is browsing a sports website via a standard web browser). Consequently, it should be appreciated that the notification 144 received from the system 102 can cause the notification 300 to be displayed on the client device even when the user is not using an application that is specifically configured to provision functionalities associated with the communication session 104.

Additionally, the notification 300 can further describe additional context associated with a communication session 104. This additional context can provide a custom reminder to the user that receives the notification 300. As shown, the notification 300 informs the user that he or she is a "required attendee" to a meeting and that he or she has "accepted" the meeting. Furthermore, the notification 300 can inform the user of an importance of the first person to join (e.g., Joe may be an organizer or an external user), of a number of invitees that have yet to join the meeting (e.g., "Four other invitees that have accepted have yet to join"), and/or of an amount of time remaining until the meeting is scheduled to start (e.g., "The meeting is scheduled to begin in 13 minutes"). This contextual information can help the user decide if he or she should immediately join the meeting.

In various implementations, the notification 300 may include one or more user interface elements. As shown, one user interface element 302 can enable the user to join the meeting based on the knowledge that the first person (i.e., "Joe") has already joined the meeting, as well as the other contextual information. Based on the selection of the user interface element 302, a join request can be generated and sent to the system (as described in FIG. 1B) and the user can be added to the meeting (as described in FIG. 1C). If the user decides that he or she does not want to immediately join the meeting, another user interface element 304 can be selected enabling the user to set a reminder based on the scheduled start time for the meeting.

FIG. 4 is a diagram illustrating an example environment 400 in which a system enables a user to join a communication session in response to receiving and viewing a notification informing the user of a join event that occurs when an organizer of the communication session joins, when a required attendee is the first required attendee to join, when an external user is the first external user to join, or when a representative from each of a plurality of different stakeholder groups has joined the communication session. This information (e.g., an identification of the organizer, an identification of a required attendee, an identification of an external user and/or of a domain, an identification of a stakeholder group, etc.) can be made available to the system 102 via the calendar data 132 and or the user accounts in the data store.

The example environment 400 is similar to the example environment 100 in FIGS. 1A-1C. However, the notification parameters 138 (further illustrated in FIG. 5) enable notifications to be generated and transmitted based on other types of join events 402. As described above, these other types of join events 402 can occur when users that are likely associated with some degree of importance join the communication session 104. For instance, these users may be ones that are commonly expected to contribute to a discussion, to provide valuable input with regard to a decision to be made during the communication session 104, to present content of a file during the communication session 104, etc.

An important user may be the organizer of a communication session 104 because the organizer of the communication session 104 often starts the discussion, guides the discussion, presents content, etc. Accordingly, another type of join event 402 that can cause a notification 404 to be transmitted can occur when an organizer joins the communication session 104.

An important user may additionally or alternatively be a required attendee to the communication session 104 because being a required attendee often signals that the user will be relied upon to contribute to the communication session 104 in some manner. Therefore, another type of join event 402 that can cause a notification 404 to be transmitted can occur when a required attendee is the first required attendee to join the communication session 104.

An important user may additionally or alternatively be a user that is external to a domain (e.g., company, office, department, geographic location, etc.) to which the organizer of the communication session 104 belongs. In a specific example, an organizer from the XYZ company may invite users from the XYZ company to the communication session 104, as well as users from a partner ABC company. Thus, the users from the partner ABC company can be considered external users that are invited to the communication session 104. An external user may be considered an important user because he or she is a guest to the communication session 104 and/or because he or she may be expected to contribute to the communication session 104 in some manner. Consequently, another type of join event 402 that can cause a notification 404 to be transmitted can occur when an external user is the first external user to join the communication session 104.

In various embodiments, some of the types of join events 402 can cause the notification 404 to be transmitted regardless of a position at which a user associated with a join event 402 is added to the communication session 104 (e.g., the user may not be the first person to join the communication session 104 as described with respect to FIGS. 1A-3).

With this in mind, the example environment 400 illustrates that the user of client device 106(1) and the user of client device 106(2) are already receiving session streams 156 and 158 in accordance with the discussion of FIGS. 1A-1C, and thus, the system 102 is facilitating the communication session 104 between these two users and these two devices.

For illustrative purposes, the user of client device 106(1) in FIG. 4 is one or more of the organizer, the first required attendee to join, or the first external user to join. Accordingly, a notification 404 (examples of which are illustrated in FIGS. 6A-6C) can be generated and transmitted to the user of client device 106(3) based on a notification parameter 138 configured to inform the user of client device 106(3) when one or more of the organizer, the first required attendee, or the first external user join the communication session 104.

In a further example, another type of join event 402 that can cause a notification 404 to be transmitted can occur when a representative from each of a plurality of different stakeholder groups (e.g., company, office, department, geographic location, etc.) has joined the communication session 104. Provided that the user of client device 106(1) and the user of client device 106(2) are from different ones of two stakeholder groups invited to the communication session 104, then a notification 404 (an example of which is illustrated in FIG. 6D) can be generated and transmitted to the user of client device 106(3) based on a notification parameter 138 configured to inform the user of client device 106(3) when a representative from each of a plurality of different stakeholder groups has joined the communication session 104. This may be relevant provided a scenario where a meeting is scheduled to discuss an issue in which each of the different stakeholder groups has an interest. Thus, invitees to the meeting may want to know when at least one representative from each stakeholder group has joined the meeting, which can signal to the invitees that a meeting may be able to start at a time that is different than a scheduled start time.

FIG. 5 illustrates an example join notification manager user interface that displays selectable options 500 configured to transmit notifications to a user when an organizer of the communication session joins, when a required attendee is the first required attendee to join, when an external user is the first external user to join, and/or when a representative from each of a plurality of different stakeholder groups has joined the communication session. Similar to the discussion above with respect to FIG. 2, in some embodiments, the user can further define conditions that must be satisfied before a notification can be transmitted.

FIG. 6A illustrates an example notification user interface that displays a notification 600 on a client device thereby informing a user that the organizer of a communication session 104 has joined the communication session 104 at a time that is different than a scheduled start time 136 for the communication session 104. As illustrated, the notification 600 is informing the user, or a viewer, of an identification (e.g., "Jane@Contoso.com") of the organizer of a meeting entitled "Product Review".

FIG. 6B illustrates an example notification user interface that displays a notification 602 on a client device thereby informing a user that the first required attendee has joined a communication session 104 at a time that is different than a scheduled start time 136 for the communication session 104. As illustrated, the notification 602 is informing the user, or a viewer, of an identification (e.g., "Jane@Contoso.com") of the first required attendee to join a meeting entitled "Product Review".

FIG. 6C illustrates an example notification user interface that displays a notification 604 on a client device thereby informing a user that the first external user has joined a communication session 104 at a time that is different than a scheduled start time 136 for the communication session 104. As illustrated, the notification 604 is informing the user, or a viewer, of an identification (e.g., "Jane@Contoso.com") of the first external participant to join a meeting entitled "Product Review".

FIG. 6D illustrates an example notification user interface that displays a notification 606 on a client device thereby informing a user that as least one representative from each of the different stakeholder groups invited to attend has joined a communication session 104 at a time that is different than a scheduled start time 136 for the communication session 104.

The notifications 600, 602, 604, 606 can further describe additional context associated with a communication session 104. This additional context can provide a custom reminder to the user that receives the notification 600. As shown, the notifications 600, 602, 604, 606 inform the user that he or she is a "required attendee" to the meeting and that he or she has "tentatively accepted" the meeting. Furthermore, the notifications 600, 602, 604, 606 can inform the user of a number of invitees that have yet to join the meeting (e.g., "Three other invitees that have accepted have yet to join"), and/or of an amount of time remaining until the meeting is scheduled to start (e.g., "The meeting is scheduled to begin in 12 minutes"). This contextual information can help the user decide if he or she should immediately join the meeting.

Similar to the discussion of FIG. 3, the notifications 600, 602, 604, 606 may include one or more user interface elements. As shown, one user interface element 302 can enable the user to join the meeting. Based on the selection of the user interface element 302, a join request can be generated and sent to the system (as described in FIG. 1B) and the user can be added to the meeting (as described in FIG. 1C). If the user decides that he or she does not want to immediately join the meeting, another user interface element 304 can be selected enabling the user to set a reminder based on the scheduled start time for the meeting.

FIG. 7 is a diagram illustrating an example environment 700 in which a system 102 enables a user to join a communication session 104 in response to receiving and viewing a notification informing the user of an event of interest that occurs in the communication session. The notification can be transmitted after consent is received from a user (e.g., the organizer) currently participating in the communication session.

The example environment 700 is similar to the example environment 100 in FIGS. 1A-1C. However, the notification parameters 138 (further illustrated in FIG. 8) enable notifications to be generated and transmitted based on other types of events 702. With this in mind, the example environment 700 illustrates that the user of client device 106(1) and the user of client device 106(2) are already receiving session streams 156 and 158 in accordance with the discussion of FIGS. 1A-1C, and thus, the system 102 is facilitating the communication session 104 between these two users and these two devices.

While the communication session 104 is ongoing, the server module 122 can be configured to access a notification parameter 138 that defines an event 702 that is configured to cause transmission of a join notification 704 to a device 106(N) of a user that is not currently participating in the communication session 104 (as further illustrated in FIGS. 10A-10F). In some embodiments, the user of device 106(N) may not have been originally invited to the communication session 104.

The event 702 can be any type of event that may be of interest to a user. In one example, the event 702 can include a user identification being spoken aloud or entered in a comment during the communication session 104. In another example, the event 702 can include content of a particular topic being discussed or presented during the communication session 104. In further examples, the event 702 can include a particular user joining or leaving the communication session 104.

The server module 122 is configured to monitor and analyze the media data 128 of the communication session 104 in order to determine (e.g., detect) that an event 702 occurs in the communication session 104. For example, the server module 122 can use voice recognition and/or natural language processing techniques to determine when users begin discussing a particular topic (e.g., the pricing of products). Moreover, the server module 122 can determine when users begin sharing content (e.g., files) associated with a particular topic (e.g., via screen sharing through one or more of the streams 142 and 154) during the communication session 104. In further examples, the server module 122 may process the media data 128 to identify instances when a user's name is verbally mentioned. In some embodiments, the user's name may be entered (e.g., typed) in a comment to a chat forum associated with a communication session 104.

In further embodiments, the event 702 can include a detected change from a first sentiment to a second sentiment during the communication session 104. For instance, the server module 122 can analyze the media data 128 to identify utterances and/or non-verbal cues captured by a camera (e.g., facial expressions, head nods, raised hands, head shakes, etc.). Such utterances and non-verbal cues may be representative of a group sentiment. The server module 122 can use this analysis to determine when the group sentiment changes from positive to negative. For example, the group sentiment may be positive when everyone is using calm voices, when there are no or very few interruptions, when the tone and the words being spoken are polite and encouraging, when facial expressions and body movements are controlled and normal, etc. In contrast, the group sentiment may be negative when people begin to raise their voices, when the number of interruptions increases indicating a contentious discussion, when the tone and the words being spoken become adversarial and rude, when facial expressions and other body movements signal anger and frustration, etc.

In various embodiments, the system 102 is configured to generate and transmit a consent notification 706 (illustrated in FIG. 9) to a device 106(1) of a user (e.g., an organizer) that is currently participating in the communication session 104 prior to transmitting the join notification 704. The consent notification 706 is configured to request consent for the system 102 to transmit the join notification 704 to the device 106(N) of the user that configures a notification parameter 138 in association with the detected event 702. If the user of device 106(1) provides the consent 708, the system 702 is permitted to transmit the join notification 704 enabling the user of device 106(N) to send a join request and join the communication session 104. Consequently, via the use of the consent notification 706 described herein, the privacy of the people already participating in the communication session 104 can be protected. The consent notification 706 may be sent to one or more designated users (e.g., an organizer) or to all users currently participating in the communication session 104.

In some implementations, the communication session 104 in the example environment 700 of FIG. 7 may be an unscheduled communication session 104 (e.g., an impromptu communication session that the participants form extemporaneously rather than schedule in advance).

FIG. 8 illustrates an example join notification manager user interface that displays selectable options 800 configured to transmit notifications to a user when an identification (e.g., a name) of the user is mentioned during a communication session, when a particular topic (e.g., the pricing of products) is discussed during a communication session, when content (e.g., files, data, etc.) associated with a particular topic (e.g., the department's financial data) is presented during a communication session, when the sentiment of a meeting changes during a communication session (e.g., turns negative), when a particular person (e.g., Jane@Contoso.com) joins a communication session, or when a particular person (e.g., Joe@Contoso.com) leaves a communication session. In various examples, these notification parameters can be set for any meetings within a particular group of people (e.g., an organization, a department, a team, etc.).

FIG. 9 illustrates an example consent notification user interface that displays a notification 900 on a client device thereby informing a user that is already participating in a communication session that an event has occurred (e.g., discussion of product pricing), and based on this occurrence, someone would like to be invited to join the communication session. Moreover, the notification 900 can include selectable options that enable the user to provide consent 902 or deny consent 904.

FIG. 10A illustrates an example notification user interface that displays a notification 1000 on a client device thereby informing a user that his or her name (e.g. Tim@Contoso.com) has been mentioned during the communication session 104. The notification 1000, as well as the notifications further described herein with respect to FIGS. 10B-10F, can further include an option to join the meeting 302 (similar to that discussed with respect to FIG. 3) and an option to decline to join the meeting 1002.

FIG. 10B illustrates an example notification user interface that displays a notification 1004 on a client device thereby informing a user that a particular topic (e.g., the pricing of products) is being discussed during the communication session 104. FIG. 10C illustrates an example notification user interface that displays a notification 1006 on a client device thereby informing a user that a particular topic (e.g., the department's financial data) is being presented during the communication session 104. FIG. 10D illustrates an example notification user interface that displays a notification 1008 on a client device thereby informing a user that a group sentiment during the communication session 104 is changing to a negative sentiment (e.g., the meeting is becoming quite argumentative). FIG. 10E illustrates an example notification user interface that displays a notification 1010 on a client device thereby informing a user that a particular user (e.g., Jane@Contoso.com) has joined the communication session 104. FIG. 10F illustrates an example notification user interface that displays a notification 1012 on a client device thereby informing a user that a particular user (e.g., Joe@Contoso.com) has left the communication session 104.

As described herein, a media stream can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 122 is configured to receive a collection of various media streams from the client devices 106(1-N). In some scenarios, not all the client devices that are receiving data associated with the communication session 104 may provide a media stream. For example, a client device may only be a consuming, or an "observing," device such that it only receives content associated with the communication session 104 but does not provide any content to the communication session 104.

The server module 122 is configured to generate session data 130 based on the media data 128. In various examples, the server module 122 can select aspects of the media data 128 that are to be shared with the participating client devices. Consequently, the server module 122 may configure the session data 130 for the individual client devices.

In examples described herein, client devices 106(1-N) are configured to participate in the communication session 104 by receiving and rendering for display, on a user interface of a display screen, stream data. The stream data can comprise a collection of various instances, or streams, of live content. For example, an individual stream of live content can comprise media data associated with a video feed (e.g., audio and visual data that capture the appearance and speech of a user participating in the communication session). Another example of an individual stream of live content can comprise media data that includes a graphical representation of a user (e.g., an avatar and/or a photograph) participating in the communication session 104 along with audio data that captures the speech of the user. Yet another example of an individual stream of live content can comprise media data that includes a file displayed on a display screen along with audio data that captures the speech of a user. Accordingly, the various streams of live content enable a remote meeting to be facilitated between a group of people and the sharing of content within the group of people.

Network connections may be used to facilitate the communication session 104. Network(s) may include, for example, public networks such as the Internet, private networks such as an institutional and/or personal intranet, or some combination of private and public networks. Network(s) may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) may utilize communications protocols, including packet-based and/or datagram-based protocols such as Internet protocol ("IP"), transmission control protocol ("TCP"), user datagram protocol ("UDP"), or other types of protocols. Moreover, network(s) may also include a number of devices that facilitate network communications and/or form a hardware basis for the networks, such as switches, routers, gateways, access points, firewalls, base stations, repeaters, backbone devices, and the like. In some examples, network(s) may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, 802.11ac, and so forth), and other standards.

In various examples, device(s) 108 may include one or more computing devices that operate in a cluster or other grouped configuration to share resources, balance load, increase performance, provide fail-over support or redundancy, or for other purposes. For instance, device(s) 108 may belong to a variety of classes of devices such as traditional server-type devices, desktop computer-type devices, and/or mobile-type devices. Thus, although illustrated as a single type of device (e.g., a server-type device), device(s) 108 may include a diverse variety of device types and are not limited to a particular type of device. Device(s) 108 may represent, but are not limited to, server computers, desktop computers, web-server computers, personal computers, mobile computers, laptop computers, tablet computers, or any other sort of computing device.

A client device (e.g., one of client device(s) 106(1-N)) may belong to a variety of classes of devices, which may be the same as, or different from, device(s) 108, such as traditional client-type devices, desktop computer-type devices, mobile-type devices, special purpose-type devices, embedded-type devices, and/or wearable-type devices. Thus, a client device can include, but is not limited to, a desktop computer, a game console and/or a gaming device, a tablet computer, a personal data assistant ("PDA"), a mobile phone/tablet hybrid, a laptop computer, a telecommunication device, a computer navigation type client device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorders ("PVR"), a set-top box, a camera, an integrated component (e.g., a peripheral device) for inclusion in a computing device, an appliance, or any other sort of computing device.

As used herein, the integer "N" is used to denote an open-ended integer number of instances of various components described herein. Accordingly, where two or more different components (e.g., client device(s) 106, etc.) are described as having an $N^{th}$ number of instances, these components may have the same number of instances or may have different numbers of instances.

FIGS. 11-13 are each a flow diagram illustrating aspects of a routine for computationally efficient generation and transmission of a notification. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

It should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Additionally, the operations illustrated in FIGS. 11-13 can be implemented in association with the example user interfaces described above. For instance, the various device(s) and/or module(s) described herein can generate, transmit, receive, and/or display data associated with content of a communication session (e.g., live content, broadcasted event, recorded content, etc.) and/or a presentation UI that includes renderings of one or more participants of remote computing devices, avatars, channels, chat sessions, video streams, images, virtual objects, and/or applications associated with a communication session.

FIG. 11 illustrates a routine 1100 for transmitting and displaying a notification informing a user that another user is the first person to join a communication session at a time that is different than a scheduled start time for the communication session.

The routine 1100 begins at operation 1102, where the system 102 accesses calendar data that defines a scheduled start time for a communication session and an invitee list for the communication session. The invitee list includes at least a first user and a second user.

At operation 1104, the system 102 determines that an account associated with the first user defines a notification parameter configured to cause a transmission of a notification to a first device associated with the first user in response to determining that an invitee on the invitee list is a first person to join the communication session.

At operation 1106, the system 102 receives, from a second device associated with the second user and at a time that is different than the scheduled start time, an indication that the second user is the first person to join the communication session.

At operation 1108, the system 102 transmits the notification to the first device associated with the first user. As described above, the notification causes the first device to display (i) information indicating that the second user is the first person to join the communication session and (ii) a user interface element that is selectable to generate a join request on behalf of the first user.

At operation 1110, the system 102 receive the join request from the first device based on a selection of the user interface element.

And at operation 1112, the system 102 communicates, based on reception of the join request, data to the first device and to the second device to facilitate the communication session between the first user and the second user.

FIG. 12 illustrates a routine 1200 for transmitting and displaying a notification informing a user of a join event that occurs when an organizer of a communication session joins, when a required attendee is the first required attendee to join, when an external user is the first external user to join, or when a representative from each of a plurality of different stakeholder groups has joined the communication session.

The routine 1200 begins at operation 1202, where the system 102 accesses calendar data that defines a scheduled start time for a communication session and an invitee list for the communication session.

At operation 1204, the system 102 accesses a notification parameter that defines a join event for transmitting a notification configured to request that a user on the invitee list join the communication session. As described above, the join event is configured to signal that the communication session can start at a time that is different than the scheduled start time.

At operation 1206, the system 102 determines, at the time that is different than the scheduled start time, an occurrence of the join event.

At operation 1208, the system 102 transmits the notification to a device associated with the user.

At operation 1210, the system 102 receives a join request from the device.

At operation 1212, the system 102 communicates, based on reception of the join request, data to the device to facilitate the communication session for the user.

FIG. 13 illustrates a routine 1300 for transmitting and displaying a notification informing a user of an event of interest that occurs in a communication session. The notification can be transmitted after consent is received from a user currently participating in the communication session.

The routine 1300 begins at operation 1302, where the system 102 accesses, in association with a communication session, a notification parameter that is configured to cause transmission of a join notification to a first device associated with the first user upon an occurrence of an event of interest to a first user, wherein the join notification invites the first user to join the communication session.

At operation 1304, the system 102 determines that the event of interest to the first user occurs in the communication session.

At operation 1306, the system 102 transmits, based at least in part on determining that the event of interest to the first user occurs in the communication session, a consent notification to a second device associated with a second user that is currently participating in the communication session. As described above, the consent notification is configured to request consent for the system to transmit the join notification to the first device associated with the first user.

At operation 1308, the system 102 receives, from the second device, the consent for the system to transmit the join notification to the first device associated with the first user.

At operation 1310, the system 102 transmits, based at least in part on reception of the consent, the join notification to the first device associated with the first user.

At operation 1312, the system 102 receives a join request from the first device.

At operation 1314, the system 102 communicates, based on reception of the join request, data to the first device and to the second device to facilitate the communication session between the first user and the second user.

It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

FIG. 14 illustrates a diagram that shows example components of an example device 1400 configured to generate and/or transmit data for some of the user interfaces disclosed herein. The device 1400 may generate data that may include one or more sections that may render or comprise video, images, virtual objects, and/or content for display on a display screen. The device 1400 may represent one of the device(s) described herein.

As illustrated, the device 1400 includes one or more data processing unit(s) 1402, computer-readable media 1404, and communication interface(s) 1406. The components of the device 1400 are operatively connected, for example, via a bus 1409, which may include one or more of a system bus, a data bus, an address bus, a PCI bus, a Mini-PCI bus, and any variety of local, peripheral, and/or independent buses.

As utilized herein, data processing unit(s), such as the data processing unit(s) 1402 and/or data processing unit(s) 110, may represent, for example, a CPU-type data processing unit, a GPU-type data processing unit, a field-programmable gate array ("FPGA"), another class of DSP, or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 1404 and computer-readable media 114, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 1406 may represent, for example, network interface controllers ("NICs") or other types of transceiver devices to send and receive communications over a network. Furthermore, the communication interface(s) 1406 may include one or more video cameras and/or audio devices 1422 to enable generation of video feeds and/or still images, and so forth.

In the illustrated example, computer-readable media 1404 includes a data store 1408. In some examples, the data store 1408 includes data storage such as a database, data warehouse, or other type of structured or unstructured data storage. In some examples, the data store 1408 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 1408 may store data for the operations of processes, applications, components, and/or modules stored in computer-readable media 1404 and/or executed by data processing unit(s) 1402 and/or accelerator(s). For instance, in some examples, the data store 1408 may store session data 1410 (e.g., session data 130), profile data 1412 (e.g., associated with a participant profile), and/or other data. The session data 1410 can include a total number of participants (e.g., users and/or client computing devices) in a communication session, activity that occurs in the communication session, a list of invitees to the communication session, and/or other data related to when and how the communication session is conducted or hosted. The data store 1408 may also include content data 1414, such as the content that includes video, audio, or other content for rendering and display on one or more of the display screens.

Alternately, some or all of the above-referenced data can be stored on separate memories 1416 on board one or more data processing unit(s) 1402 such as a memory on board a CPU-type processor, a GPU-type processor, an FPGA-type accelerator, a DSP-type accelerator, and/or another accelerator. In this example, the computer-readable media 1404 also includes an operating system 1418 and application programming interface(s) 1411 (APIs) configured to expose the functionality and the data of the device 1400 to other devices. Additionally, the computer-readable media 1404 includes one or more modules such as the server module 1430 and the output module 1432, although the number of illustrated modules is just an example, and the number may vary higher or lower. That is, functionality described herein in association with the illustrated modules may be performed by a fewer number of modules or a larger number of modules on one device or spread across multiple devices.

The disclosure presented herein also encompasses the subject matter set forth in the following clauses.

Example Clause A, a system comprising: one or more processing units; and a computer-readable medium having encoded thereon computer-executable instructions to cause the one or more processing units to: access calendar data that defines a scheduled start time for a communication session and an invitee list for the communication session, wherein the invitee list includes at least a first user and a second user; determine that an account associated with the first user defines a notification parameter configured to cause a transmission of a notification to a first device associated with the first user in response to determining that an invitee on the invitee list is a first person to join the communication session; receive, from a second device associated with the second user and at a time that is different than the scheduled start time, an indication that the second user is the first person to join the communication session; transmit, in response to receiving the indication and based at least in part on the notification parameter, the notification to the first device associated with the first user, wherein the notification causes the first device to display (i) information indicating that the second user is the first person to join the communication session and (ii) a user interface element that is selectable to generate a join request on behalf of the first user; receive the join request from the first device based on a selection of the user interface element; and communicate, based on reception of the join request, data to the first device and to the second device to facilitate the communication session between the first user and the second user.

Example Clause B, the system of Example Clause A, wherein the computer-executable instructions further cause the one or more processing units to determine that a condition is satisfied prior to transmitting the notification to the first device, wherein the condition comprises a status indicating that the first user has accepted or tentatively accepted an invite to the communication session.

Example Clause C, the system of Example Clause A or Example Clause B, wherein: the invitee list further includes a third user for which a status indicates a declined invite to the communication session; and the status indicating the declined invite to the communication session prevents a third device associated with the third user from receiving the notification.

Example Clause D, the system of any one of Example Clause A through C, wherein the computer-executable instructions further cause the one or more processing units to determine that a condition is satisfied prior to transmitting the notification to the first device, wherein the condition comprises a current time being within a threshold time range that is measured based at least in part on the scheduled start time for the communication session.

Example Clause E, the system of any one of Example Clause A through D, wherein the information displayed further indicates at least one of: whether the second user is an organizer of the communication session; whether the second user is a required attendee to the communication session; or a number of other invitees planning or tentatively planning to attend the communication session that have yet to join the communication session at the time the indication is received.

Example Clause F, a computer-implemented method, comprising: accessing calendar data that defines a scheduled start time for a communication session and an invitee list for the communication session; accessing a notification parameter that defines a join event for transmitting a notification configured to request that a user on the invitee list join the communication session, wherein the join event is configured to signal that the communication session can start at a time that is different than the scheduled start time; determining, at the time that is different than the scheduled start time, an occurrence of the join event; in response to determining the occurrence of the join event, transmitting the notification to a device associated with the user; receiving a join request from the device; and communicating, based on reception of the join request, data to the device to facilitate the communication session for the user.

Example Clause G, the computer-implemented method of Example Clause F, wherein the join event comprises an invitee on the invitee list being a first person to join the communication session.

Example Clause H, the computer-implemented method of Example Clause F, wherein the join event comprises an organizer of the communication session joining the communication session.

Example Clause I, the computer-implemented method of Example Clause F, wherein the join event comprises an invitee on the invitee list being a first required attendee to join the communication session.

Example Clause J, the computer-implemented method of Example Clause F, wherein the join event comprises an invitee on the invitee list being a first person that is external to a domain to which an organizer of the communication session belongs to join the communication session.

Example Clause K, the computer-implemented method of Example Clause F, wherein the join event comprises one representative from each of a plurality of different stakeholder groups joining the communication session.

Example Clause L, the computer-implemented method of any one of Example Clauses F through K, wherein the notification comprises at least one of: whether the user is a required attendee to the communication session; or a number of invitees planning or tentatively planning to attend the communication session that have yet to join the communication session at the time the occurrence of the join event is determined.

Example Clause M, a system comprising: one or more processing units; and a computer-readable medium having encoded thereon computer-executable instructions to cause the one or more processing units to: access, in association with a communication session, a notification parameter that is configured to cause transmission of a join notification to a first device associated with a first user upon an occurrence of an event of interest to the first user, wherein the join notification invites the first user to join the communication session; determine that the event of interest to the first user occurs in the communication session; transmit, based at least in part on determining that the event of interest to the first user occurs in the communication session, a consent notification to a second device associated with a second user that is currently participating in the communication session, wherein the consent notification is configured to request consent for the system to transmit the join notification to the first device associated with the first user; receive, from the second device, the consent for the system to transmit the join notification to the first device associated with the first user; transmit, based at least in part on reception of the consent, the join notification to the first device associated with the first user; receive a join request from the first device; and communicate, based on reception of the join request, data to the first device and to the second device to facilitate the communication session between the first user and the second user.

Example Clause N, the system of Example Clause M, wherein the event comprises an identification associated with the first user being spoken aloud or entered in a comment during the communication session.

Example Clause O, the system of Example Clause M, wherein the event comprises content of a particular topic being discussed during the communication session.

Example Clause P, the system of Example Clause M, wherein the event comprises content of a particular topic being presented during the communication session.

Example Clause Q, the system of Example Clause M, wherein the event comprises a detected change from a first sentiment to a second sentiment during the communication session.

Example Clause R, the system of Example Clause M, wherein the event comprises a particular user joining the communication session.

Example Clause S, the system of Example Clause M, wherein the event comprises a particular user leaving the communication session.

Example Clause T, the system of any one of Example Clauses M through S, wherein the second user comprises an organizer of the communication session.

It is to be appreciated that conditional language used herein such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

It should also be appreciated that many variations and modifications may be made to the above-described examples, the elements of which are to be understood as being among other acceptable examples. All such modifications and variations are intended to be included herein within the scope of this disclosure and protected by the following claims.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A system comprising:
   one or more processing units; and
   a computer-readable medium having encoded thereon computer-executable instructions to cause the one or more processing units to:
   access calendar data that defines a scheduled start time for a communication session and an invitee list for the communication session, wherein the invitee list identifies at least a first user and a second user;
   receive, at a time that is different than the scheduled start time, an indication that the second user has joined the communication session via a second device;
   transmit, in response to receiving the indication, a notification to a first device associated with the first user, wherein the first user has not yet joined the communication session and the notification causes the first device to display:
      (i) information indicating an identification of the second user and that the second user has joined the communication session, and
      (ii) a user interface element that is selectable to generate a join request on behalf of the first user;
   receive the join request based on a selection of the user interface element; and
   communicate, responsive to the join request, data to the first device and to the second device to facilitate the communication session between the first user and the second user.

2. The system of claim 1, wherein the computer-executable instructions further cause the one or more processing units to:
   determine, based on a status of the first user indicated in the calendar data, that the first user has accepted or tentatively accepted an invite to the communication session, wherein transmitting the notification to the first device is conditioned on the status of the first user indicating that the first user has accepted or tentatively accepted an invite to the communication session.

3. The system of claim 1, wherein the computer-executable instructions further cause the one or more processing units to:
   determine, based on a status of a third user that is identified by the invitee list, that the third user has declined an invite to the communication session, wherein the status of the third user indicating that the third user has declined the invite prevents transmission of a corresponding notification, indicating that the second user has joined the communication session, to a third device associated with the third user.

4. The system of claim 1, wherein the computer-executable instructions further cause the one or more processing units to:
   determine that a time difference between a current time and the scheduled start time for the communication session is within a threshold time range, wherein transmitting the notification to the first device is conditioned on the time difference being within the threshold time range.

5. The system of claim 1, wherein the computer-executable instructions further cause the one or more processing units to:
   determine, based on the calendar data, that the second user is an organizer of the communication session, wherein transmitting the notification to the first device responsive to the indication that the second user has joined the communication session is conditioned on the second user being the organizer of the communication session.

6. The system of claim 1, wherein the computer-executable instructions further cause the one or more processing units to:
   determine, based on the calendar data, that the second user is a required attendee of the communication session, wherein transmitting the notification to the first device responsive to the indication that the second user has joined the communication session is conditioned on the second user being the required attendee of the communication session.

7. The system of claim 1, wherein the computer-executable instructions further cause the one or more processing units to:
   determine, based on the calendar data, that the second user is external to a predetermined domain to which the first user belongs, wherein transmitting the notification to the first device responsive to the indication that the second user has joined the communication session is conditioned on the second user being external to the predetermined domain.

8. The system of claim 1, wherein the computer-executable instructions further cause the one or more processing units to:

determine the second user is a first person to join the communication session, wherein transmitting the notification to the first device responsive to the indication that the second user has joined the communication session is further based on the second user being the first person to join the communication session.

9. A computer-implemented method, comprising:

accessing calendar data that defines a scheduled start time for a communication session and an invitee list for the communication session;

accessing a notification parameter that defines a join event for transmitting a notification to a first user on the invitee list responsive to one or more occurrences of the join event, wherein the join event corresponds to a second user on the invitee list joining the communication session at a time that is different than the scheduled start time;

determining an occurrence of the join event;

in response to determining the occurrence of the join event, transmitting the notification to a device associated with the first user, wherein the first user has not yet joined the communication session and the notification includes an identification of the second user and a user interface element that is selectable to generate a join request;

receiving the join request from the device; and communicating, based on reception of the join request, data to the device to facilitate the communication session between the first user and one or more other users that are currently participating in the communication session, wherein the one or more other users includes the second user.

10. The computer-implemented method of claim 9, wherein the join event is associated with the second user being a first person to join the communication session.

11. The computer-implemented method of claim 9, wherein the join event is associated with the second user being a first required attendee to join the communication session.

12. The computer-implemented method of claim 9, wherein the join event is associated with the second user being a first person that is external to a predetermined domain to join the communication session.

13. The computer-implemented method of claim 12, wherein an organizer of the communication session belongs to the predetermined domain.

14. The computer-implemented method of claim 9, wherein the join event is associated with two different users from two different stakeholder groups joining the communication session.

15. The computer-implemented method of claim 9, wherein the determining the occurrence of the join event includes determining that a particular topic is being discussed during the communication session.

16. The computer-implemented method of claim 15, further comprising:

responsive to determining that the particular topic is being discussed during the communication session, transmitting a consent notification to another device associated with another user that is currently participating in the communication session;

receiving, based on the consent notification, an indication of consent for the notification to be transmitted to the first user, wherein the transmitting the notification to the device associated with the first user is conditioned on the receiving the indication of consent.

17. A system comprising:

one or more processing units; and a computer-readable medium having encoded thereon computer-executable instructions to cause the one or more processing units to:

access calendar data that defines, for a communication session, a scheduled start time and an invitee list that identifies a first user and a second user;

determine, at a time that is different than the scheduled start time, an occurrence of a join event corresponding to the first user joining the communication session, wherein the join event corresponding to the first user joining the communication session is defined based on input from the second user received prior to the scheduled start time;

transmit, based on the occurrence of the join event, a notification to a second device associated with the second user;

receive, from the second device, a join request that is generated based on a user selection of a user interface element that is exposed via the notification; and communicate, at least partially responsive to the join request, data to the second device to facilitate the communication session between the second device that is associated with the second user and a first device that is associated with the first user.

18. The system of claim 17, wherein the join event further comprises an identification associated with the second user being spoken aloud or entered in a comment during the communication session.

19. The system of claim 17, wherein the join event further comprises a particular topic being discussed during the communication session.

20. The system of claim 17, wherein the join event further comprises a detected change from a first sentiment to a second sentiment during the communication session.

* * * * *